(12) United States Patent
Nakano

(10) Patent No.: US 7,124,789 B2
(45) Date of Patent: Oct. 24, 2006

(54) AUTOMATIC AIR FEEDING MECHANISM FOR PNEUMATIC TIRES, AND PNEUMATIC TIRE CONNECTING DEVICE

(75) Inventor: Hirofumi Nakano, Osaka (JP)

(73) Assignee: Takaji Nakano, Osaka (JP)

( * ) Notice: Subject to any disclaimer, the term of this patent is extended or adjusted under 35 U.S.C. 154(b) by 276 days.

(21) Appl. No.: 10/495,378

(22) PCT Filed: Apr. 26, 2002

(86) PCT No.: PCT/JP02/04301

§ 371 (c)(1),
(2), (4) Date: May 12, 2004

(87) PCT Pub. No.: WO03/066354

PCT Pub. Date: Aug. 14, 2003

(65) Prior Publication Data

US 2005/0000587 A1    Jan. 6, 2005

(30) Foreign Application Priority Data

Feb. 5, 2002    (JP)    ............................. 2002-027799

(51) Int. Cl.
*B65B 1/04*    (2006.01)
(52) U.S. Cl. ........................... 141/38; 141/83; 141/95; 141/198; 417/233
(58) Field of Classification Search ................ 141/38, 141/67, 83, 94, 95, 192, 198; 417/211, 233; 152/415–419; 280/304.2
See application file for complete search history.

(56) References Cited

U.S. PATENT DOCUMENTS

| | | | |
|---|---|---|---|
| 1,127,079 A | 2/1915 | Nielsen | |
| 1,744,405 A | 1/1930 | McCord | |
| 2,415,618 A | 2/1947 | West | |
| 5,342,177 A | 8/1994 | Cheng | |
| 5,452,753 A * | 9/1995 | Olney | ........................ 152/417 |

FOREIGN PATENT DOCUMENTS

| | | |
|---|---|---|
| EP | 0 302 320 | 7/1988 |
| JP | 182436 | 9/1956 |
| JP | 39-2535 | 3/1964 |
| JP | 52-75302 | 6/1977 |
| JP | 61-66001 | 5/1986 |
| JP | 62-004617 | 1/1987 |
| JP | 01-172003 | 7/1989 |
| JP | 07-323710 | 12/1995 |
| JP | 11-139118 | 5/1999 |
| WO | 97/02961 | 1/1997 |
| WO | 01/81105 | 11/2001 |

* cited by examiner

*Primary Examiner*—Timothy L. Maust
(74) *Attorney, Agent, or Firm*—Hogan & Hartson LLP

(57) ABSTRACT

To provide an automatic air supply mechanism for a pneumatic tire which can automatically supply air to a pneumatic tire by rotation of the pneumatic tire with respect to an axle when the air pressure in the pneumatic tire becomes a prescribed value or lower. There is provided an axle 101 and a wheel body rotatable with respect to the axle 101. An automatic air supply mechanism 1 is provided on the wheel body. The automatic air supply mechanism 1 has a constant pressure maintaining section 2 and a compression section 3. The constant pressure maintaining section 2 is configured to maintain the air pressure therein at a constant value and connected to the pneumatic tire mounted on the wheel body 110 in air flow communication. The compression section 3 compresses air when the wheel body 110 is rotated with respect to the axle 101 and feeds the compressed air into the constant pressure maintaining section 2.

5 Claims, 24 Drawing Sheets

AUTOMATIC AIR FEEDING MECHANISM FOR PNEUMATIC TIRES, AND PNEUMATIC TIRE CONNECTING DEVICE

CROSS-REFERENCE TO RELATED APPLICATION

The entire disclosure, including the specification, claims, drawings and abstract, of Japanese Patent Application No. 2002-27799 (filed on Feb. 5, 2002) is incorporated in this application by reference.

FIELD OF THE INVENTION

This invention relates to an automatic air supply mechanism for a pneumatic tire for automatically supplying air into a pneumatic tire rotatably mounted on an axle, and to a pneumatic tire connecting device for use in the automatic air supply mechanism.

BACKGROUND ARTS

Pneumatic tires containing air are mounted on wheels of a bicycle or a car. Even if air has been pumped into such pneumatic tires until the air pressure therein reaches a prescribed value, the air gradually escapes therefrom and the air pressure therein decreases with a lapse of time. A large decrease in tire pressure causes problems, such as making steering difficult. Thus, when the air pressure in pneumatic tires has decreased to a value which is much lower than a prescribed value, air must be supplied thereinto.

However, when the air pressure in a pneumatic tire is lower than a prescribed value, it is difficult to recognize it from the appearance thereof. Thus, in some cases, the pneumatic tire is used as it is, which might cause a danger. Also, it is troublesome to supply air into a pneumatic tire with an air supply pump or the like every time the air pressure therein decreases.

DISCLOSURE OF THE INVENTION

The present invention has been made in view of the above circumstances and it is, therefore, an object of the present invention to provide an automatic air supply mechanism for a pneumatic tire which can automatically supply air into a pneumatic tire by rotation of the pneumatic tire with respect to an axle when the air pressure therein becomes lower than a prescribed value and a pneumatic tire connecting device therefor.

The automatic air supply mechanism for a pneumatic tire according to this invention is an automatic air supply mechanism for a pneumatic tire for automatically supplying air into a pneumatic tire mounted on a wheel body rotatable with respect to an axle, comprising an air feeding section provided on a wheel and connected to the pneumatic tire in air flow communication for feeding air into the pneumatic tire, the air feeding section being provided with a compression section which can compress air when the wheel body is rotated with respect to the axle.

The pneumatic tire connecting device according to this invention is a pneumatic tire connecting device for connecting an automatic air supply mechanism for a pneumatic tire for automatically supplying air into a pneumatic tire mounted on a wheel body rotatable about an axle to a pneumatic tire, comprising a tire connection section connected to the pneumatic tire, an automatic supply mechanism connection section connected to the automatic air supply mechanism, a pneumatic tire connecting air passage provided between the tire connection section and the automatic supply mechanism connection section in air flow communication, and an air introducing hole communicating the pneumatic tire connecting air passage with the outside, the pneumatic tire connecting air passage being configured to be able to pass air from the automatic air supply mechanism to the pneumatic tire by being connected to an air passage provided in the automatic air supply mechanism when the automatic supply mechanism connection section and the automatic air supply mechanism are connected, the tire connection section having a valve hole opened to communicate the pneumatic tire connecting air passage with the outside and provided with a valve mounting part to which a check valve for preventing backflow of air from the pneumatic tire to the pneumatic tire connecting air passage can be attached, the air introducing hole being provided with an air introducing hole backflow preventing means for preventing air from escaping from the pneumatic tire connecting air passage to the outside, whereby, when the check valve is attached to the valve mounting part, the valve hole is closed by the check valve so that backflow of air from the pneumatic tire to the pneumatic tire connecting air passage can be prevented in connecting the tire connection section and the pneumatic tire, and when air is fed from the pneumatic tire connecting air passage to the valve hole, the valve hole is opened so that air can enter the pneumatic tire from the pneumatic tire connecting air passage.

Although the features of this invention can be described widely as above, the constitution and details, together with the objects and features, of this invention will be more apparent from the following disclosure taken in conjunction with the accompanying drawings.

BEST MODE FOR CARRYING OUT THE INVENTION

Description will be hereinafter made of an embodiment of this invention based on the drawings.

Figure 1:
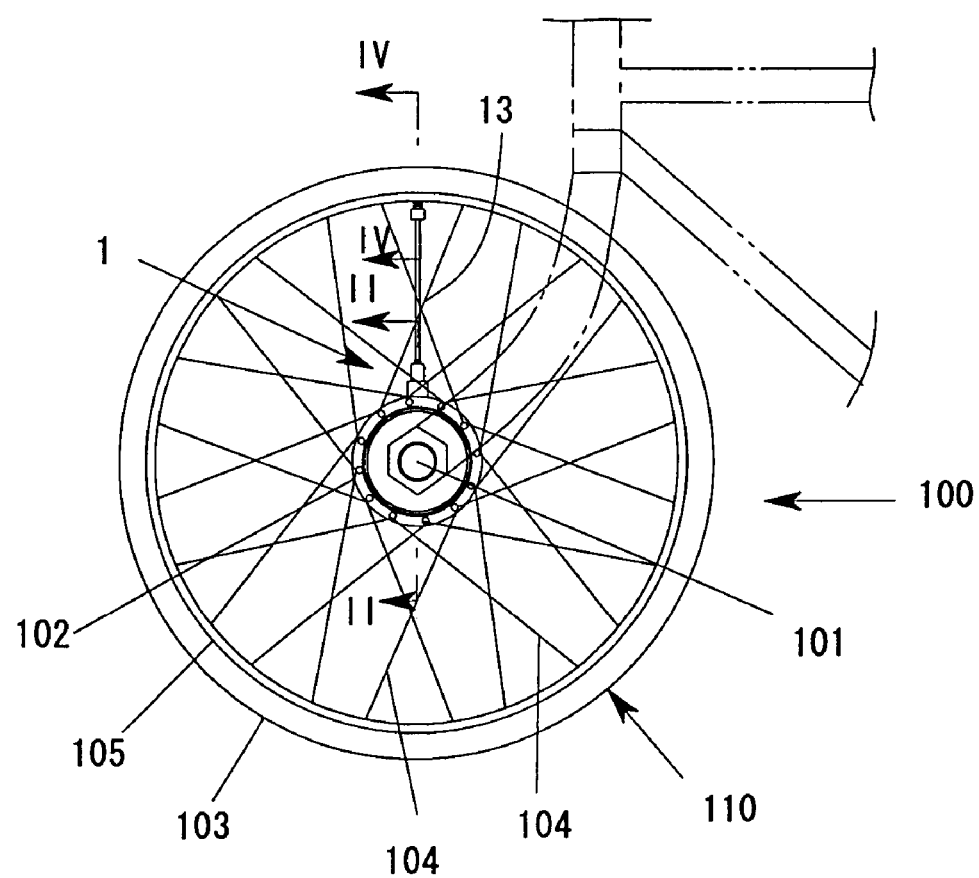
FIG. 1 is a side view of a bicycle wheel provided with an automatic air supply mechanism for a pneumatic tire according to a first embodiment of this invention.
Figure 2:
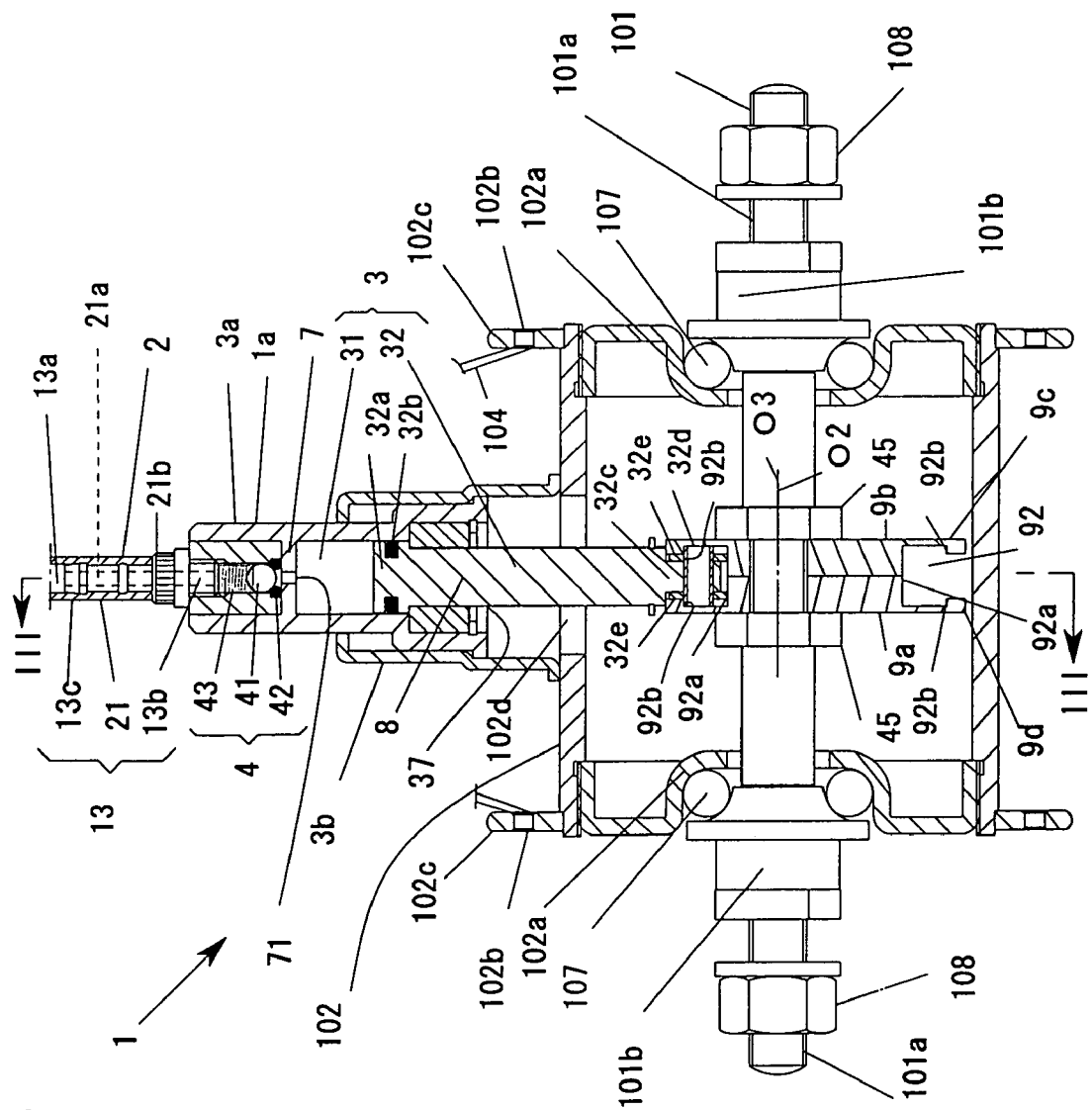
FIG. 2 is an enlarged cross-sectional explanatory view taken along the line II—II in FIG. 1.
Figure 3:
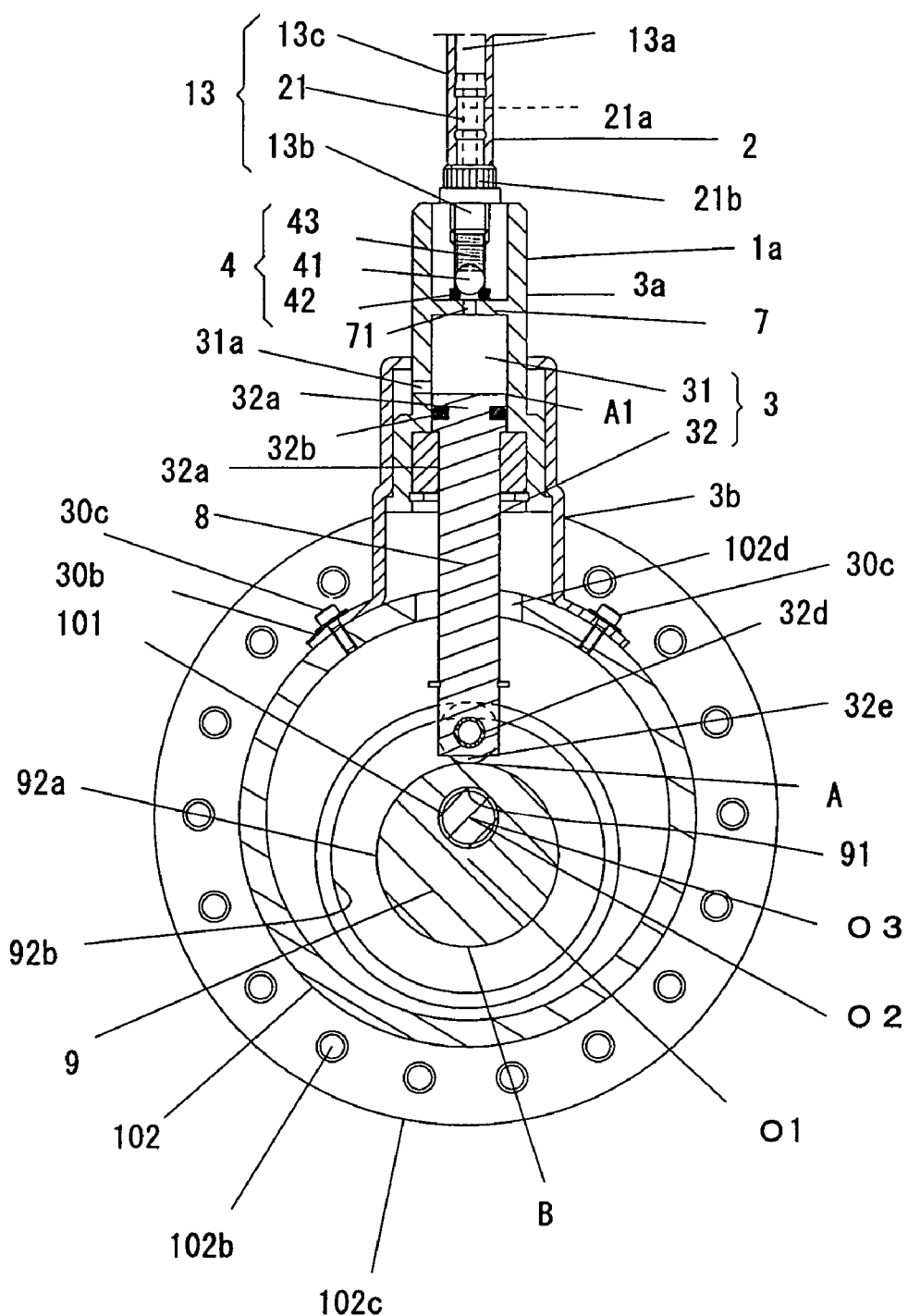
FIG. 3 is a longitudinal cross-sectional explanatory view taken along the line III—III in FIG. 2.

FIG. 1 is a side view of a bicycle wheel provided with an automatic air supply mechanism for a pneumatic tire according to a first embodiment of this invention. FIG. 2 is an enlarged cross-sectional explanatory view taken along the line II—II in FIG. 1. FIG. 3 is an enlarged cross-sectional view taken along the line III—III in FIG. 2.

The automatic air supply mechanism for a pneumatic tire of the first embodiment is provided on a bicycle wheel 100. The bicycle wheel 100 provided with the automatic air supply mechanism 1 for a pneumatic tire has an axle 101 and a wheel body 110 rotatable with respect to the axle 101. The axle 101 has thread parts 101a on the outer periphery as shown in FIG. 2.

As shown in FIG. 1, the wheel body 110 has a hub 102, a pneumatic tire 103 and the automatic air supply mechanism 1. As shown in FIG. 2, the hub 102 has a cylindrical body, and has inner peripheral sides on which steel ball roller bearings 102a and 102a are respectively provided on both right and left sides thereof. The steel ball roller bearings 102a and 102a are supported for rotation about the central axis O3 of the axle 101 by ball pushers 101b and 10b, respectively, threaded on the axle 101 via steel balls 107, . . . , 107. The hub 102 has outer peripheral sides to which collars 102c and 102c having a plurality of spoke holes 102b, . . . , 102b are respectively secured on both right and left sides thereof. In the spoke holes 102b, 102b of the collars 102c and 102c are engaged the base end sides of spokes 104. As shown in FIG. 1, the distal end sides of the spokes 104 are fixed to a rim 105. Thereby, the rim 105 is fixed to the hub 102 and allowed to rotate with respect to the axle 101.

Figure 4:
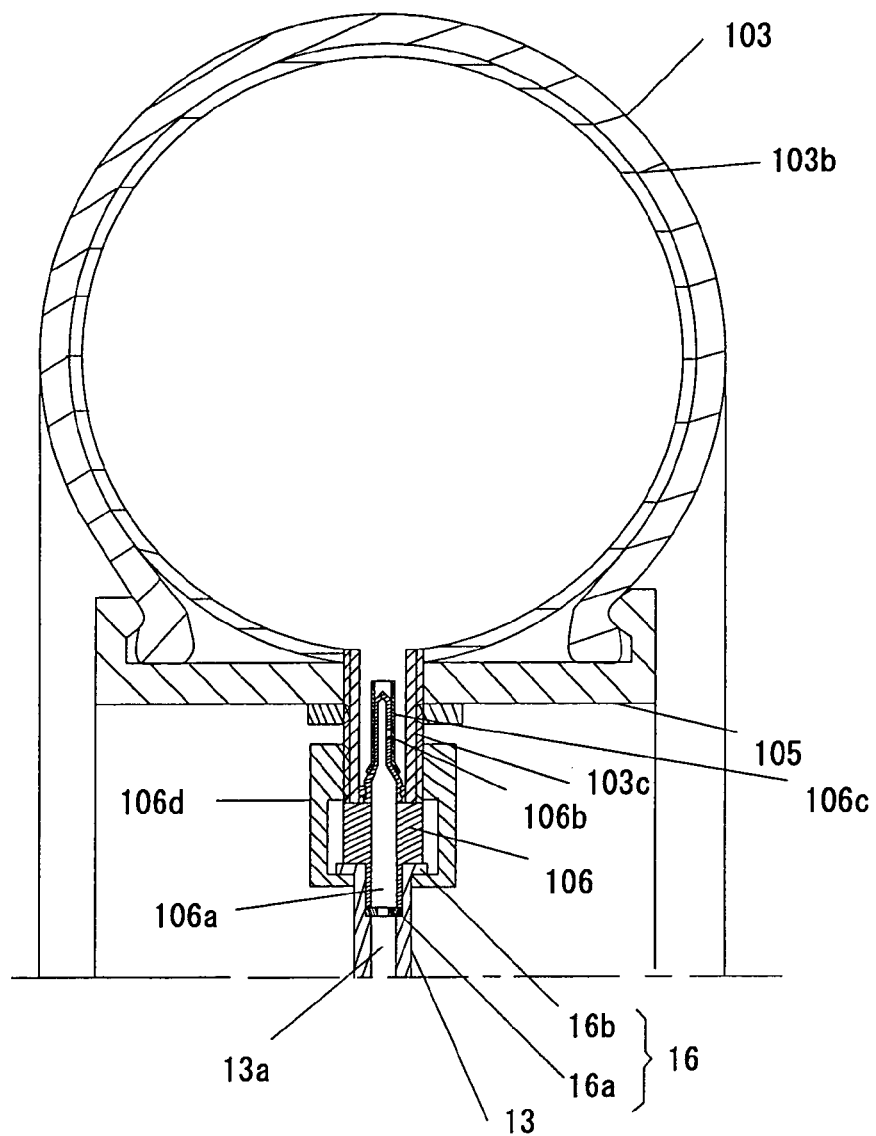
FIG. 4 is an enlarged cross-sectional explanatory view taken along the line IV—IV in FIG. 1.

The pneumatic tire 103 is removably fitted on the rim 105 and thus is rotatable together with the rim 105 with respect to the axle 101. As shown in FIG. 4, an air holding tube 103b as an air holding section for holding air is provided in the pneumatic tire 103.

The air holding tube 103b has a valve 106 through which air is supplied and discharged. The valve 106 is constituted of a cylindrical body and has an air supply port 106a at the lower end as seen in the drawing and a valve hole 106b at the upper end as seen the drawing. The valve hole 106b is closed by a cylindrical check valve 106c of a synthetic rubber fitted on the outer periphery of the valve 106.

The valve 106 is received in a cylindrical valve mounting piece 103c attached to the air holding tube 103b and is prevented from coming off by a valve fixing nut 106d threaded on the valve mounting piece 103c. When air is fed through the air supply port 106a against the elasticity of the check valve 106c closing the valve hole 106b with an air pump or the like, the air pushes away the check valve 106c and enters the air holding tube 103b. After air has been fed into the air holding tube 103b, the check valve 106c closes the valve hole 106 because of its elasticity. Thereby, the air in the air holding tube 103b is prevented from escaping through the valve hole 106b. The check valve 106c, the valve mounting piece 103c and the valve fixing nut 106d are the same as those employed in an ordinary air holding tube 103b for a bicycle.

The opposite ends of the axle 101 of the wheel 100 constituted as above are secured to a bicycle body via nuts 108 and 108 (shown in FIG. 2), whereby the wheel body 110 is rotatably attached to the bicycle body.

Description will be made of the automatic air supply mechanism 1. The automatic air supply mechanism 1 for a pneumatic tire for a bicycle of the first embodiment has an air feeding section 1a for feeding air into the pneumatic tire 103 as shown in FIG. 2 and FIG. 3.

The air feeding section 1a has a compression section 3 for compressing air and a constant pressure maintaining section 2 for maintaining the pressure of air compressed in the compression section 3 at a constant value.

The compression section 3 has a compression chamber 31 in which air is compressed and compression operation means 32 for performing operations to compress air in the compression chamber 31.

The compression chamber 31 is formed in an inner casing 3a having a circular cross-section. The lower side of the inner casing 3a as seen in FIG. 2 and FIG. 3 is fitted in an outer casing 3b having a circular cross-section and supported thereby. The outer casing 3b has hub fitting parts 30b at the lower end as seen in FIG. 2 and FIG. 3. The hub fitting parts 30b are secured to the outer periphery of the hub 102 via bolts 30c and 30c. Thereby, the inner casing 3a is attached to the outer periphery of the hub 102 via the outer casing 3b and extends outward from the outer periphery of the hub 102 in a radial direction of the axle 101.

A partition 7 is provided in the inner casing 3a attached to the hub 102 as above. The partition 7 allows the inside of the inner casing 3a to be partitioned into the compression chamber 31 on the lower side as seen in the drawings and a hereinafter described constant pressure maintaining space part 13b of the constant pressure maintaining section 2. A communication hole 71 is formed through the partition 7. The compression chamber 31 and the constant pressure maintaining space part 13b are connected in air flow communication by the communication hole 71.

The communication hole 71 is provided with a check valve 4. The check valve 4, which serves as backflow preventing means for preventing backflow of air from the constant pressure maintaining section 2 to the compression chamber 31, is constituted of a ball valve 4 disposed on the side of the constant pressure maintaining section 2 in this embodiment. The ball valve 4 has a ball 41, a ring-shaped ball receiving packing 42 of a synthetic rubber for receiving the ball, and a ball urging coil spring 43 as an urging member for urging the ball 41 toward the ball receiving packing 42. The ball 41 closes the communication hall 71 from the side of the constant pressure maintaining section 2 because of the urging force of the ball urging coil spring 43.

The compression chamber 31 is provided with a suction hole 31a through which air is fed thereinto from the outside as shown in FIG. 3. The compression chamber 31 is also provided with a rod guiding port 37 at the lower side as seen in FIG. 2 and FIG. 3.

The compression operation means 32 has a rod-like piston rod 8 as a compression operation body extending in the radial direction of the axle 101, and a cam 9. The piston rod 8 is slidably inserted through the rod guiding port 37 of the compression chamber 31. The upper part of the piston rod 8, as seen in the drawings, extending outward in the radial direction of the axle 101 is inserted in the compression chamber 31. The part of the piston rod 8 inserted in the compression chamber 31 is provided with a disk-shaped sliding part 32a.

The sliding part 32a has a diameter which is generally the same as the inside diameter of the compression chamber 31 and is slidable along the inside wall of the compression chamber 31 in the axial direction of the compression chamber 31. The sliding part 32a is provided with a ring-shaped packing 32b of a synthetic rubber.

The lower part of the piston rod 8, as seen in the drawing, extends inward in the radial direction of the axle 101 through the rod guiding port 37 of the compression chamber 31 and a piston introducing hole 102d formed through the hub 102 to the inside of the inner periphery of the hub 102. A cam contact part 32c is provided on this part.

The cam contact part 32c comprises a roller shaft 32d, and a pair of right and left rollers 32e and 32e rotatably supported by the piston rod 8 via the roller shaft 32d as shown in FIG. 2 in this embodiment. The both right and left ends of the roller shaft 32d are protruded from the rollers 32e and 32e, respectively. The rollers 32e and 32e of the cam contact part 32c constituted as above are in contact with a cam 9 secured on the axle 101.

The cam 9 is constituted of a disk-like groove cam and has a cam groove 92 formed around the entire periphery thereof. The cam groove 92 has a cam face 92a defining the contour of the cam 9 which is in contact with the rollers 32e and 32e and on which the rollers 32e and 32e can run, and shaft contact parts 92b and 92b for receiving the roller shaft 32d of the cam contact part 32c.

The cam face 92a is formed in a circle around the entire periphery of the cam 9 with a prescribed depth from the outer peripheral surface thereof. The shaft contact parts 92b and 92b are formed on opposite walls formed opposite the cam face 92a in the cam groove 92.

The cam contact part 32c of the piston rod 8 is located in the cam groove 92, whereby the rollers 32e and 32e are in contact with the cam face 92a. Since the roller shaft 32d is in contact with the shaft contact parts 92b, the rollers 32e and 32e in contact with the cam face 92a is prevented from separating therefrom. Thus, the cam 9 in this embodiment constitutes a positive motion cam, so that the cam 9 and the rollers 32e and 32e of the piston rod 8 are maintained in constant contact with each other.

An axle through hole 91 for receiving the axle 101 is formed through the cam 9 as shown in FIG. 3. The center O2 of the axle through hole 91 is a prescribed distance offset from the center O1 of the cam face 92a and the shaft contact parts 92b and 92b.

After the axle 101 has been inserted through the axle through hole 91, the cam 9 is secured to the axle 101 from both right and left sides with cam fixing nuts 45 and 45 as shown in FIG. 2. In this fixed state, the center O2 of the axle through hole 91 coincides with the center of rotation O3 of the hub 102.

Thus, the position on the cam face 92a in contact with the rollers 32e and 32e shown in FIG. 3 is a small radius part A, where the distance from the center O2 of the axle through hole 91 is smallest. The distance from the center O2 of the axle through hole 91 gradually increases circumferentially, and a position halfway around the circumference of the cam 9 from the small radius part A is a large radius part B, where the distance from the center O2 of the axle through hole 91 is largest.

Figure 5:
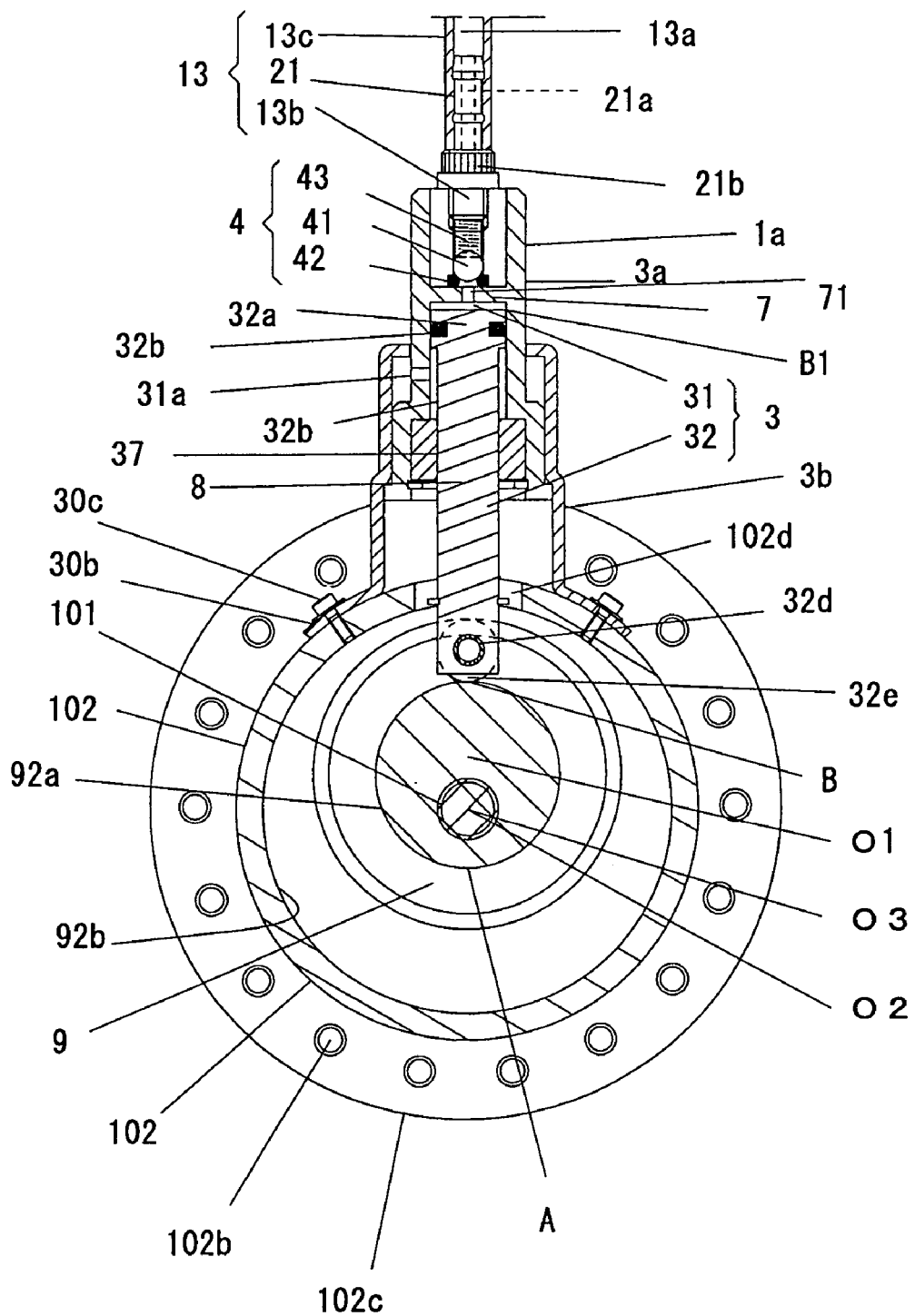
FIG. 5 is a cross-sectional explanatory view illustrating the state where air in a compression chamber is compressed.

When the rollers 32e and 32e are at the small radius part A of the cam face 92a, the sliding part 32a of the piston rod 8 is in its lowermost position in the compression chamber 31, namely at the bottom dead center position A1 as shown in FIG. 3. When the rollers 32e and 32e are at the large radius part B of the cam face 92a, the sliding part 32a of the piston rod 8 is in its uppermost position B1 in the compression chamber 31 as shown in FIG. 5.

The constant pressure maintaining section 2 of the air feeding section 1a maintains the air pressure at a constant value. The constant pressure maintaining section in this embodiment is constituted of a connection section connecting the compression section 3 and the pneumatic tire 103.

The connection section 13 comprises the constant pressure maintaining space part 13b formed on the upper side in the compression chamber 31 in the inner casing 3a by a partition as seen in FIG. 2, a connection tube 21 and a connection pipe 13c.

The connection tube 21 has a cylindrical shape and has an air passage 21a therein. The connection tube 21 has a base end side which is attached to the inner casing 3 via a fixing nut 21b with its end inserted in the pressure maintaining space part 13b of the inner casing 3a. Thereby, the distal end side of the connection tube 21 extends outward from the inner casing 3a in the radial direction of the axle 101. This attachment allows the constant pressure maintaining space part 13b and the air passage 21a to be connected in air flow communication.

The connection pipe 13c is made of an elastic material and has an air passage 13a therein. The connection pipe 13c is attached to the distal end of the connection tube 21 with its end press-fitted over the outer periphery of the connection tube 21. Thereby, the air passage 21a of the connection tube 21 and the air passage 13a of the connection pipe 13c are connected and one air passage is formed in the connection section 13. As a result, the constant pressure maintaining space part 13b of the inner casing 3a and the connection pipe 13c are connected to each other.

As shown in FIG. 4, a pneumatic tire connection section 16 removably connectable to the pneumatic tire 103 is provided at the distal end of the connection pipe 13c which is opposite the side attached to the connection tube 21. The pneumatic tire connection section 16 has a packing 16a and a nut engaging piece 16b engageable with the valve fixing nut 106d of the air holding tube 103b. The nut engaging piece 16b is engaged with the valve fixing nut 106d with the packing 16a in contact with an end of the valve 106. Thereby, the distal end of the connection pipe 13c is connected to the air holding tube 103b in air flow communication.

Description will be made of the operation of the automatic air supply mechanism for a bicycle pneumatic tire of the first embodiment. The axle 101 of the bicycle wheel 100 provided with the automatic air supply mechanism for a bicycle pneumatic tire is attached to a bicycle body. The pneumatic tire 103 is rotated with respect to the axle 101 from the state shown in FIG. 2 where the sliding part 32a is located at the bottom dead center position A by, for example, running the bicycle. Then, the hub 102 is rotated by the rotation of the pneumatic tire 103 and the rollers 32e of the piston rod 8 run on the cam face 92a of the cam 9 with the hub 102 from the small radius part A toward the large radius part B.

When the rollers 32e run, the piston rod 8 is pressed by the cam 9 outward in the radial direction thereof, and moved. Thus, the cam 9 functions as a pressing part for pressing the piston rod 8. The movement of the piston rod 8 allows the sliding part 32a to be slid in the compression chamber 31 along the inside wall thereof from the bottom dead center position A1 toward the top dead center position B1.

Then, when the rollers 32e of the piston rod 8 come to the large radius part B of the cam face 92a, the sliding part 32a of the piston rod 8 reaches the top dead center position B1 as shown in FIG. 5. The sliding movement of the sliding part 32a allows the air in the compression chamber 31 to be compressed at a certain compression ratio. Although the cam 9 is fixed to the axle 101 and does not change its position and the piston rod 8 runs on the cam face 92a of the cam 9 and changes its position, the position of the piston rod 8 is not changed and the position of the cam face 92a is changed in FIG. 5, and FIGS. 7 and 10 to be described later for convenience of explanation.

When the hub 102 is further rotated, the piston rod 8 runs on the cam face 92a of the cam 9 from the large radius part B to the small radius part A. Thereby, the sliding part 32a is moved from the top dead center position B1 to the bottom dead center position A1 in the compression chamber 31. When the sliding part 32a is moved from the top dead center position B1 to the bottom dead center position A1, outside air is sucked into the compression chamber 31 through the suction hole 31a. When the hub 102 is further rotated, the sliding part 32a of the piston rod 8 is moved again from the bottom dead center position A1 to the top dead center position B1 and the air in the compression chamber is compressed at a certain compression ratio. As described above, the sliding part 32a is reciprocated between the bottom dead center position A1 and the top dead center position B1.

The reciprocation of the sliding part 32a between the two positions allows the air in the compression chamber to be compressed at a prescribed compression ratio so that the air in the compression chamber can flow therefrom into the pneumatic tier and the air pressure in the pneumatic tire can be a value appropriate to the pneumatic tire in a normal state. The normal state herein is a state where the air pressure in the compression chamber has got close to a certain value by repeated compression of the air in the compression chamber, by repeated reciprocation of the compression sliding part 32a between the two positions in this embodiment.

When the air in the compression chamber 31 is compressed, the ball 41 of the check valve 4 is pressed from the compression chamber 31 by the pressure of the compressed air. At this time, the ball 41 of the check valve 4 is receiving a pressing force caused by the pressure of the air in the constant pressure maintaining chamber 11 and an urging force of the ball urging coil spring 43 from the side of the constant pressure maintaining chamber 11. Thus, when the pressing force from the side of the constant pressure maintaining chamber 11 is smaller than that from the side of the compression chamber 31, the ball 41 of the check valve 4 is moved to the side of the constant pressure maintaining chamber 11 and opens the communication hole 71. Thereby, the air compressed in the compression chamber 31 is fed into the constant pressure maintaining chamber 11 through the communication hole 71.

Then, the ball 41 of the check valve 4 closes the communication hole 71 when the sliding part 32a is moved from the top dead center position B1 toward the bottom dead center position A1 in the compression chamber 31. Thereby, the air in the constant pressure maintaining chamber 11 can be prevented from returning to the compression chamber 31.

Then, the pressing force pressing the ball 41 from the side of the constant pressure maintaining chamber 11 becomes equal to the pressing force from the inside of the compression chamber 31, the movement of the ball 41 is stopped and the communication hole 71 is closed. Thereby, the air pressure in the constant pressure maintaining chamber 11 is maintained at a prescribed value.

The air in the constant pressure maintaining chamber 11 maintained at a prescribed pressure enters the valve 106 of the air holding tube 103b and presses the check valve 106c closing the valve hole 106b from the inside of the valve 106. Then, when the pressing force applied to the check valve 106c from the inside thereof by the pressure of air in the constant pressure maintaining chamber 11 is greater than the total of the elastic force of the check valve 106c and the pressing force applied to the check valve 106c by the pressure of air in the air holding tube 103b, the air in the constant pressure maintaining chamber 11 pushes away the check valve 106c closing the valve hole 106b from the inside thereof and flows into the air holding tube 103b.

Then, when the pressing force applied to the check valve 106c by the pressure of air in the constant pressure maintaining chamber 11 becomes equal to the total of the elastic force of the check valve 106c and the pressing force applied to the check valve 106c by the pressure of air in the air holding tube 103b, the air flow into the air holding tube 103b is stopped.

Thereafter, when the air pressure in the air holding tube 103b decreases and the total of the elastic force of the check valve 106c and the pressing force applied to the check valve 106c by the pressure of air in the air holding tube 103b becomes smaller than the pressing force applied to the check valve 106c by the pressure of air in the constant pressure maintaining chamber 11 with a lapse of time, the air in the constant pressure maintaining chamber 11 again pushes away the check valve 106c closing the valve hole 106b from the inside thereof and flows into the air holding tube 103b. Thereby, the air pressure in the air holding tube 103b is always maintained at a constant value.

When the connection pipe 13c comes off the connection tube 21 of the constant pressure maintaining section 2 or the pneumatic tire 103, or when the connection pipe 13c is damaged, the air pressure in the pneumatic tire 103 can be maintained by the valve 106 of the pneumatic tire 103. Thus, the valve 106 of the pneumatic tire 103 can serve as backflow preventing means for preventing backflow of air from the pneumatic tire 103 to the air feeding section 1a.

When the air pressure in the constant pressure maintaining chamber 11 becomes lower than a prescribed value after the feed of air to the air holding tube 103b, compressed air is fed from the compression chamber 31 to the constant pressure maintaining chamber 11 to maintain the air pressure therein at a prescribed value.

In order to remove the connection pipe 13c after adjusting the air pressure in the air holding tube 103b to a prescribed value with the automatic air supply mechanism 1 as described above, the connection pipe 13c is pulled out of the connection tube 21 of the constant pressure maintaining section 2 and the valve fixing nut 106d fixing the pneumatic tire connection section 16 is removed from the pneumatic tire 103. Thereby, the connection pipe 13c can be removed. After removing the connection pipe 13c, since the valve 106 can prevent the air in the pneumatic tire from escaping through the air supply port 106a, the pneumatic tire can be used in the same manner as a conventional tire.

The cam 9 of the first embodiment is constituted of a left cam piece 9a and a right cam piece 9b fitted together with fixing means such as a bolt. In fitting the left cam piece 9a and the right cam piece 9b together, the roller shaft 32d and the rollers 32e and 32e assembled to the piston rod 8 are placed in the cam groove 92 before fixing the left cam piece 9a and the right cam piece 9b together.

In the first embodiment, the shaft contact parts 92b and 92b are formed on both right and left sides, respectively, in the cam groove 92 and the opposite ends of the roller shaft 32d are contacted on the shaft contact parts 92b and 92b, respectively. This invention, however, is not limited to the configuration and can be modified as needed. For example, the right wall 9c or left wall 9d of the cam groove 92 may be removed to form an opening on the right or left side of the cam groove 92 and to form the shaft contact part 92b on one of the left wall 9d and the right wall 9c so that the roller shaft 32d and the rollers 32e and 32e assembled to the piston rod 8 can be put in and taken out of the cam groove 92 through the opening.

Thereby, when the connection between the cam 9 and the piston rod 8 has to be released, by releasing the fixing between the casings 3a and 3b, to which the piston rod 8 has been assembled, and the hub 102 and moving the casings 3a and 3b in the axial direction of the axle 101 toward the opening of the cam 9, the roller shaft 32d and the rollers 32e and 32e of the piston rod 8 can be removed from the cam groove 92, whereby the connection therebetween can be released. In order to connect the cam 9 and the piston rod 8, the above operation is reversed. Namely by moving the casing 3a and 3b to which the piston rod 8 has been assembled in the axial direction of the axle 101, the roller shaft 32d and the rollers 32e and 32e of the piston rod 8 can be put into the cam groove 92 from the opening of the cam 9, whereby the cam 9 and the piston rod 8 can be connected.

Thus, when a trouble occurred in the casing 3a or 3b, the casings 3a and 3b can be removed from the hub 102 by operating the casing 3a and 3b to which the piston rod 8 has been assembled to release the connection between the piston rod 8 and the cam 9 and inspection and repair in the casings 3a and 3b can be performed without disassembling the hub. This makes maintenance easy. Also, when the cam groove 92 is provided with an opening through which the roller shaft 32d and the rollers 32e and 32e can be put therein and taken out thereof as described above, the cam 9 can be constituted of one cam piece and thus can be produced with ease.

Figure 6:
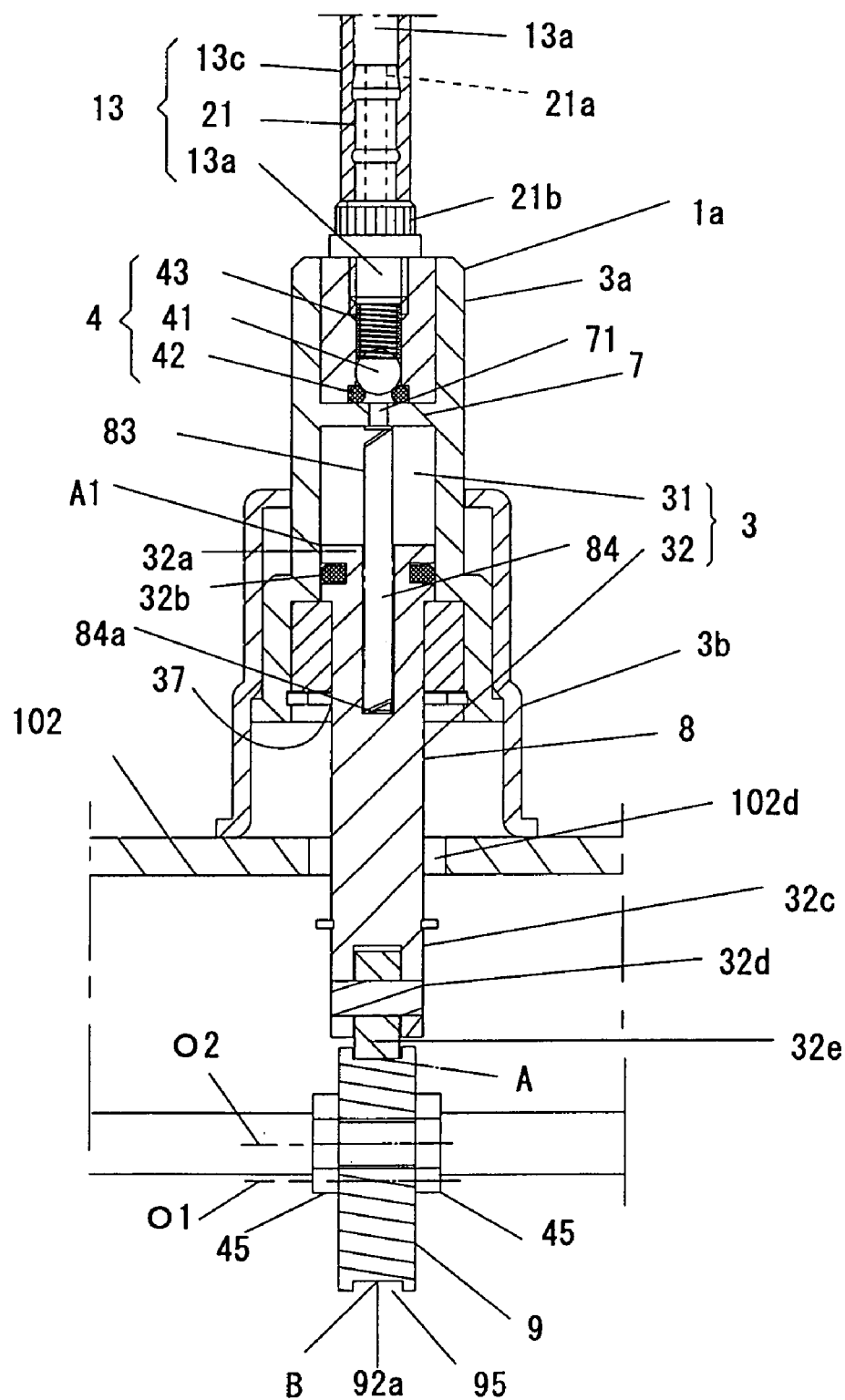
FIG. 6 is an enlarged cross-sectional explanatory view of an essential part of a bicycle wheel provided with an automatic air supply mechanism for a pneumatic tire according to a second embodiment of this invention.
Figure 7:
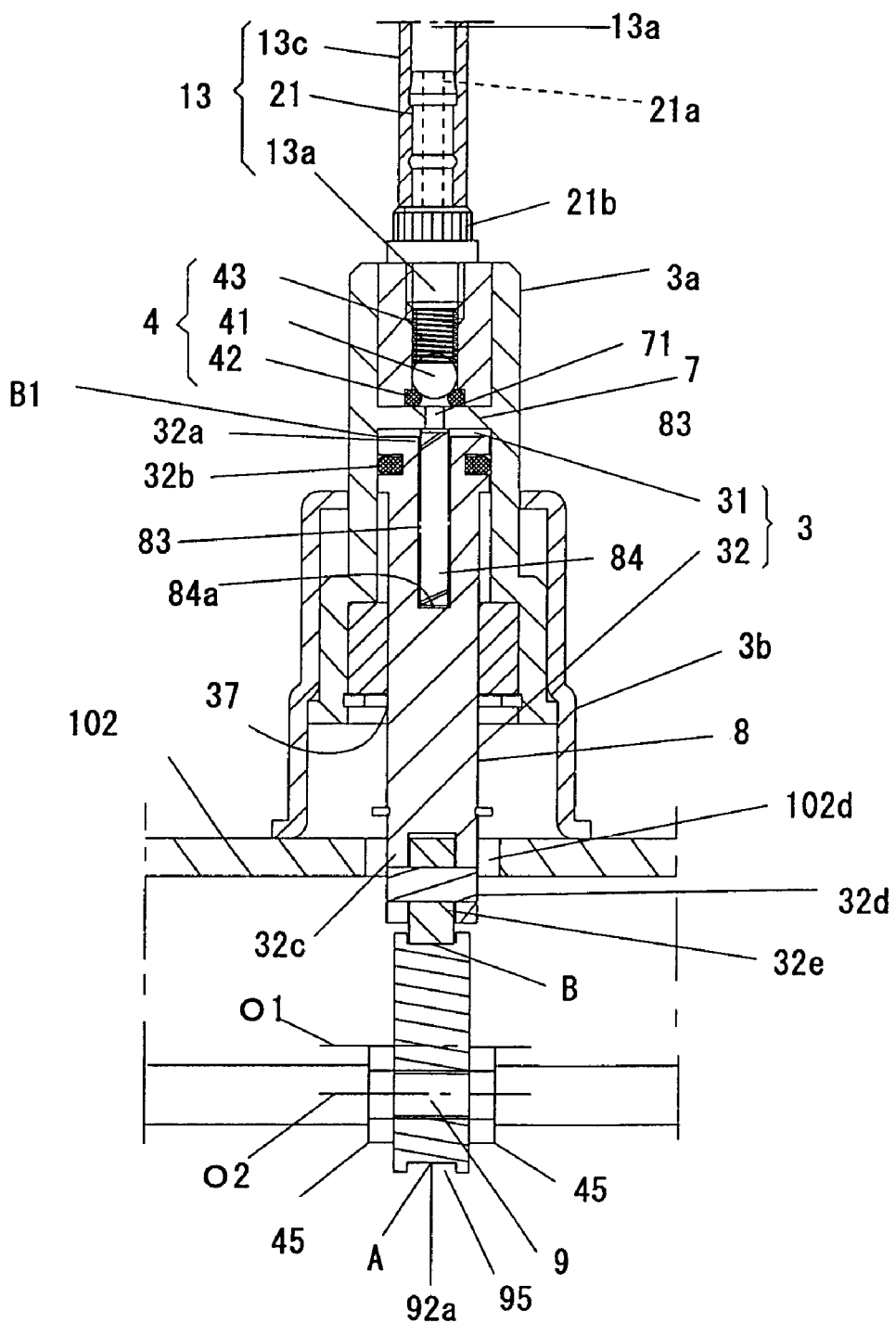
FIG. 7 is a cross-sectional explanatory view illustrating the state where air in a compression chamber is compressed in the second embodiment.

Description will be hereinafter made of an automatic air supply mechanism for a pneumatic tire according to a second embodiment based on FIG. 6 and FIG. 7. The automatic air supply mechanism for a pneumatic tire of the second embodiment has a piston rod 8 having a roller 32e rotatably supported by a roller shaft 32d.

The piston rod 8 is constantly urged inward in a radial direction of an axle 101 (downward as seen in the drawings) by a piston rod urging coil spring 83 as a piston rod urging member disposed in a compression chamber 31. More specifically, the upper end of the coil spring 83 as seen in FIG. 6 is in contact with a partition 7, and the lower end of the coil spring 83 as seen in FIG. 6 is received in a spring receiving hole 84 formed in the piston rod 8 and in contact with a bottom end surface 84a of the spring receiving hole 84. Thereby, the piston rod 8 is constantly urged inward in the radial direction of the axle 101.

A cam 9 in contact with the roller 32e has a cam face 92a formed on the bottom surface of a recess 95 formed in the outer periphery of the cam 9 with a prescribed depth. The cam face 92a is formed into a circle with its center O1 offset from the center of rotation O2 of the hub 102, and has a small radius part A, where the distance from the center of rotation O2 of the hub 102 is smallest, and a large radius part B, where the distance from the center of rotation O2 of the hub 102 is largest, at a point halfway around the cam 9 from the small radius part A as in the case with the cam face in the first embodiment. The other configurations of the second embodiment are the same as those of the first embodiment.

In the second embodiment, the roller 32e in contact with the small radius part A of the cam face 92a is pressed against the cam face 92a when the hub 102 is rotated and runs in contact with the cam face 92a to the large radius part B. When the roller 32e runs from the large radius part B to the small radius part A, the roller 32e is pressed against the cam face 92a by an urging force of the piston rod urging coil spring 83 and runs in contact with the cam face 92. Thereby, the roller 32e of the piston rod 8 runs on the cam face 92a and a sliding part 32a of the piston rod 8 is repeatedly reciprocated between a bottom dead center position A1 shown in FIG. 6 and a top dead center position B1 shown in FIG. 7 to compress the air in the compression chamber 31 at a certain compression ratio.

Description will be made of an automatic air supply mechanism for a pneumatic tire according to a third embodiment based on FIG. 8 to FIG. 10. The automatic air supply mechanism for a pneumatic tire of the third embodiment has a compression chamber 31 formed of a casing 3c having a circular cross-section. As shown in FIG. 9, a fitting pin 36 with a thread part 36a provided on the casing 3c is inserted through a fitting hole 102f formed through the hub 102 from the inner periphery side to the outer periphery side of the hub 102, and a fixing nut 36b is threaded on the thread part 36a of the fitting pin 36. Thus, the compression chamber 31 in the third embodiment is secured to the inner periphery of the hub 102.

The compression chamber 31 has a suction hole 31a in which a valve body 34b having a packing 34d for preventing air from escaping from the compression chamber 31 to the outside is provided. The valve body 34b in this embodiment is disposed in a cylinder part 34.

As shown in FIG. 9, the cylinder part 34 has a distal end side, which is the left side end as seen in FIG. 9, provided with an air intake port 34c, and a base end side, which is the right side end as seen in FIG. 9, attached to a side wall of the compression chamber 31 with fixing means such as bolts in such a manner as to cover the suction hole 31a of the compression chamber 31 from the outside. Thereby, the compression chamber 31 is communicated with the outside via the suction hole 31a and the air intake port 34c. The valve body 34b is pivoted in the cylinder part 34 such that it can open and close the air intake port 34c from the inside of the cylinder part 34. Although not shown, the valve body 34b is constantly urged toward the air intake port 34c by an urging member.

A piston rod 80 as a compression operation body of compression operation means has a disk-shaped sliding part 32a. The piston rod 80 in this embodiment has no roller distinct from the piston rod of the first embodiment. Thus, in the third embodiment, an end of the piston rod 80 constitutes a cam contact part 32c contactable with the cam face 92 of the cam 9. The piston rod 80 is constantly urged inward in the radial direction of the axle 101 by a piston rod urging coil spring 83a.

The third embodiment has a constant pressure maintaining section 2 comprising a constant pressure maintaining chamber 11 and a connection section 13.

The constant pressure maintaining chamber 11 is formed of a box-shaped casing 4a. The casing 4a has a fitting part 14 protruded outward in the radial direction of the axle 101. The fitting part 14 has a cylindrical shape and has an air discharge hole 14a therein communicated with the constant pressure maintaining chamber 11. A thread part 14b is provided on the outer periphery of the fitting part 14.

The fitting part 14 is inserted through a fitting hole 102e formed through the hub 102 from the inner periphery side of the hub 102, and a fixing nut 14c is threaded on the thread part 14b of the fitting part 14, and tightened. Thereby, the constant pressure maintaining chamber 11 is secured to the inner periphery of the hub 102.

A connection section 13 is connected to the fitting part 14 of the constant pressure maintaining chamber 11. The connection section 13 in this embodiment is constituted of a metal connection pipe 13c having an air passage 13a for passing air therein. The connection pipe 13c has a base end side on the lower side as seen in FIG. 9 having a constant pressure maintaining connecting part 15 removably connectable to the constant pressure maintaining chamber 11.

The constant pressure maintaining chamber connecting part 15 has a packing 15a and an engaging nut 15b as shown in FIG. 9. The engaging nut 15b is threaded on the thread part 14b of the fitting part 14 with the packing 15a interposed between the connection pipe 13c and the fitting part 14 of the constant pressure maintaining chamber 11. Thereby, the base end side of the connection pipe 13c is connected to the constant pressure maintaining chamber 11 in air flow communication.

The connection pipe 13c has a distal end side provided with a pneumatic tire connection section 16 removably connectable to the pneumatic tire 103. The pneumatic tire connection section 16 has the same constitution as the pneumatic tire connection section in the first embodiment shown in FIG. 4.

Figure 11:
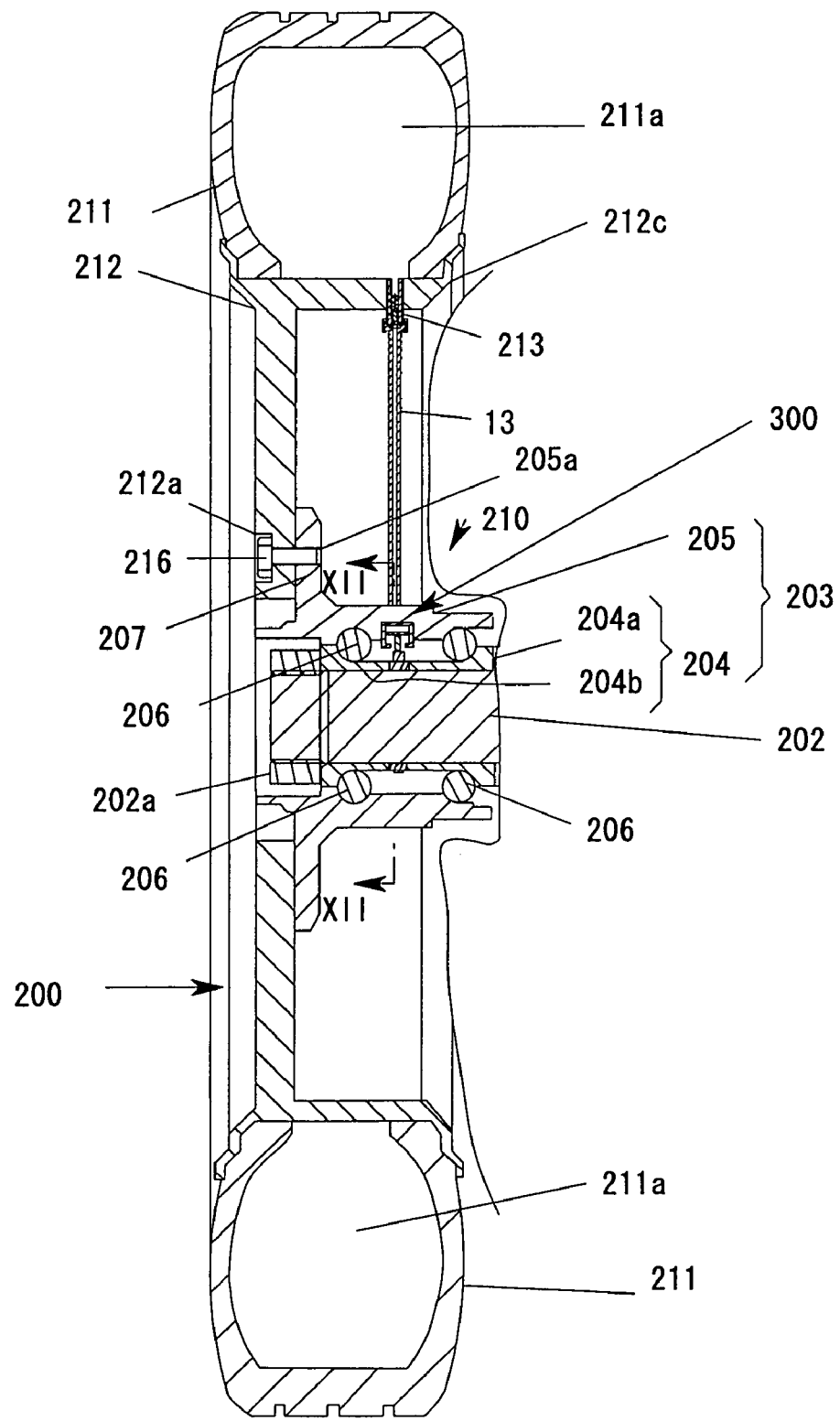
FIG. 11 is a cross-sectional explanatory view of a car wheel provided with an automatic air supply mechanism for a pneumatic tire according to a fourth embodiment of this invention.

The constant pressure maintaining chamber 11 is provided with a pressure adjusting section 12 for adjusting the air pressure in the constant pressure maintaining chamber 11. The pressure adjusting section 12 has an exhaust port 11a and a constant pressure valve 10 for opening and closing the exhaust port 11a. The exhaust port 11a is formed through a wall of the pressure maintaining chamber 11 on the right side as seen in FIG. 11 to the outside.

The constant pressure valve 10 has a cylinder part 12a having a cylindrical shape, a valve body 12b disposed for sliding movement in the axial direction of the cylinder part 12a and a constant pressure valve urging coil spring 12c as a constant pressure valve urging member for urging the valve body 12b.

The cylinder part 12a has a groove-like air vent hole 12h in the inner periphery thereof. The air vent hole 12h is formed in the inner periphery of the cylinder part 12a in the axial direction thereof from the distal end, on the right side as seen in the drawing, to a point in the vicinity of the base end, on the left side as seen in the drawing. The cylinder part 12a is attached to the side wall of the constant pressure maintaining chamber 11 having the air discharge port 11a in such a manner as to cover the air discharge port 11a from the outside of the constant pressure maintaining chamber 11.

The valve body 12b has a valve body 12d having a rubber packing 12g and a guide rod part 12e extending from the valve body 12d. The valve body 12b is disposed in the cylinder part 12a with the guide rod part 12e slidably inserted through a through hole 12f formed through the distal end side of the cylinder part 12a, whereby the valve body 12d is slidable in the cylinder part 12a along the inside wall thereof in the axial direction thereof.

The constant pressure valve urging coil spring 12c is disposed in the cylinder part 12a and constantly urges the valve body 12d toward the constant pressure maintaining chamber 11. Thereby, the valve body 12d closes the exhaust port 11a of the constant pressure maintaining chamber 11 and shuts off the communication between the exhaust port 11a and the air vent hole 12h. The constant pressure valve 10 is not limited to this configuration and can be modified as needed. For example, the constant pressure valve 10 may be constituted of a ball valve as described in the first embodiment.

The constant pressure maintaining chamber 11 and the compression chamber 31 are communicated with each other by a communication hole 71. The communication hole 71 in the third embodiment is formed of a communication tube 31c. In the communication hole 71 is provided a check valve 35 as backflow preventing means for preventing backflow of air from the constant pressure maintaining chamber 11 to the compression chamber 31. The check valve 35 in this embodiment has a packing 35a and pivoted in the communication tube 31c such that it can open and close the air feeding port 31d from the inside of the communication tube 31c. The check valve 35 prevents backflow of air from the constant pressure maintaining chamber 11 to the compression chamber 31, and the air pressure in the constant pressure maintaining chamber 11 can be maintained at a constant value by the pressure adjusting section 12 as pressure adjusting means and the check valve 35. The check valve 35 is urged by an urging member (not shown) toward the air feeding port 31d.

Figure 8:
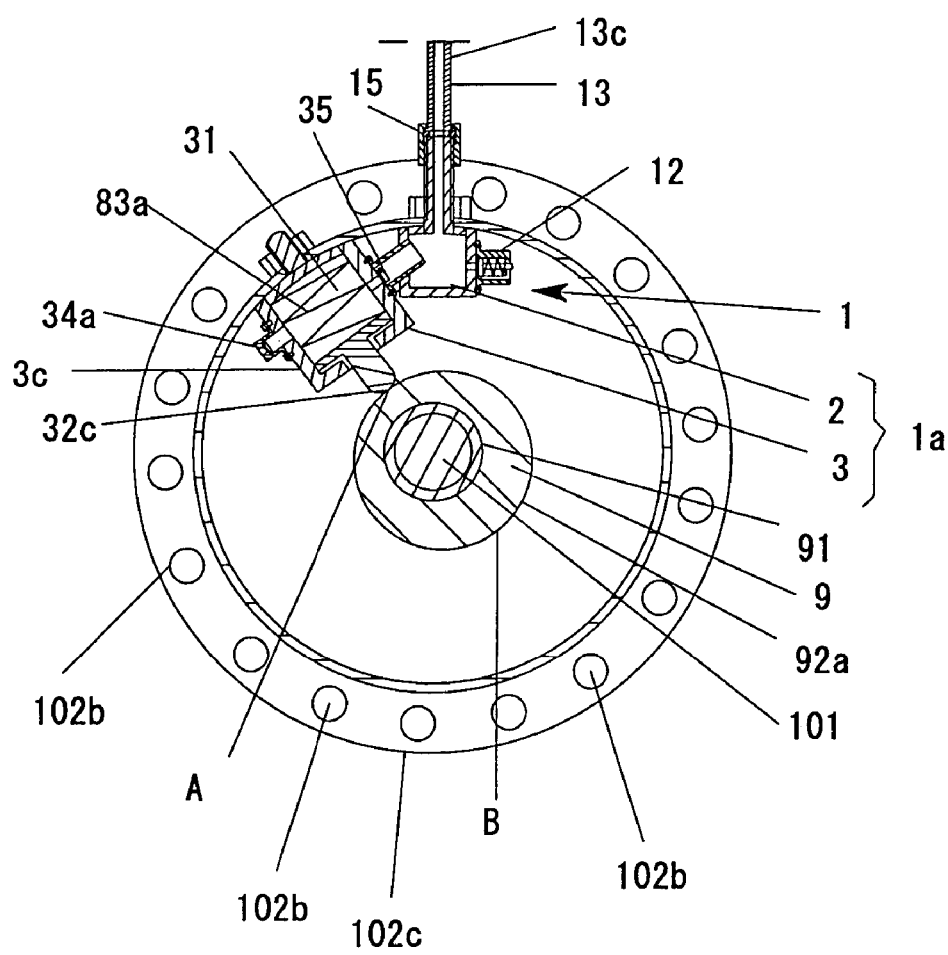
FIG. 8 is a cross-sectional explanatory view of an essential part of a bicycle wheel provided with an automatic air supply mechanism for a pneumatic tire according to a third embodiment of this invention.
Figure 9:
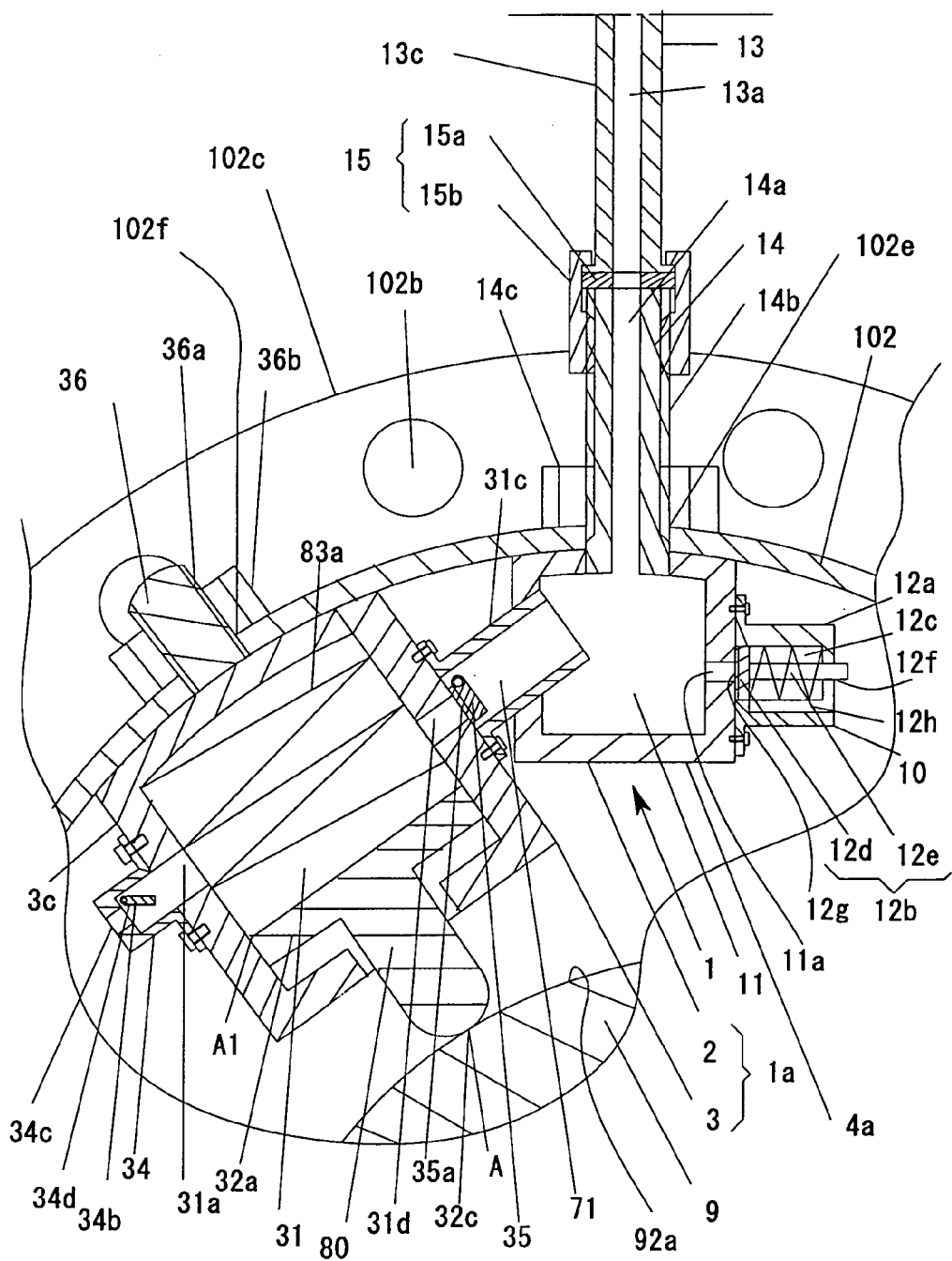
FIG. 9 is an enlarged cross-sectional explanatory view of an essential part in FIG. 8.
Figure 10:
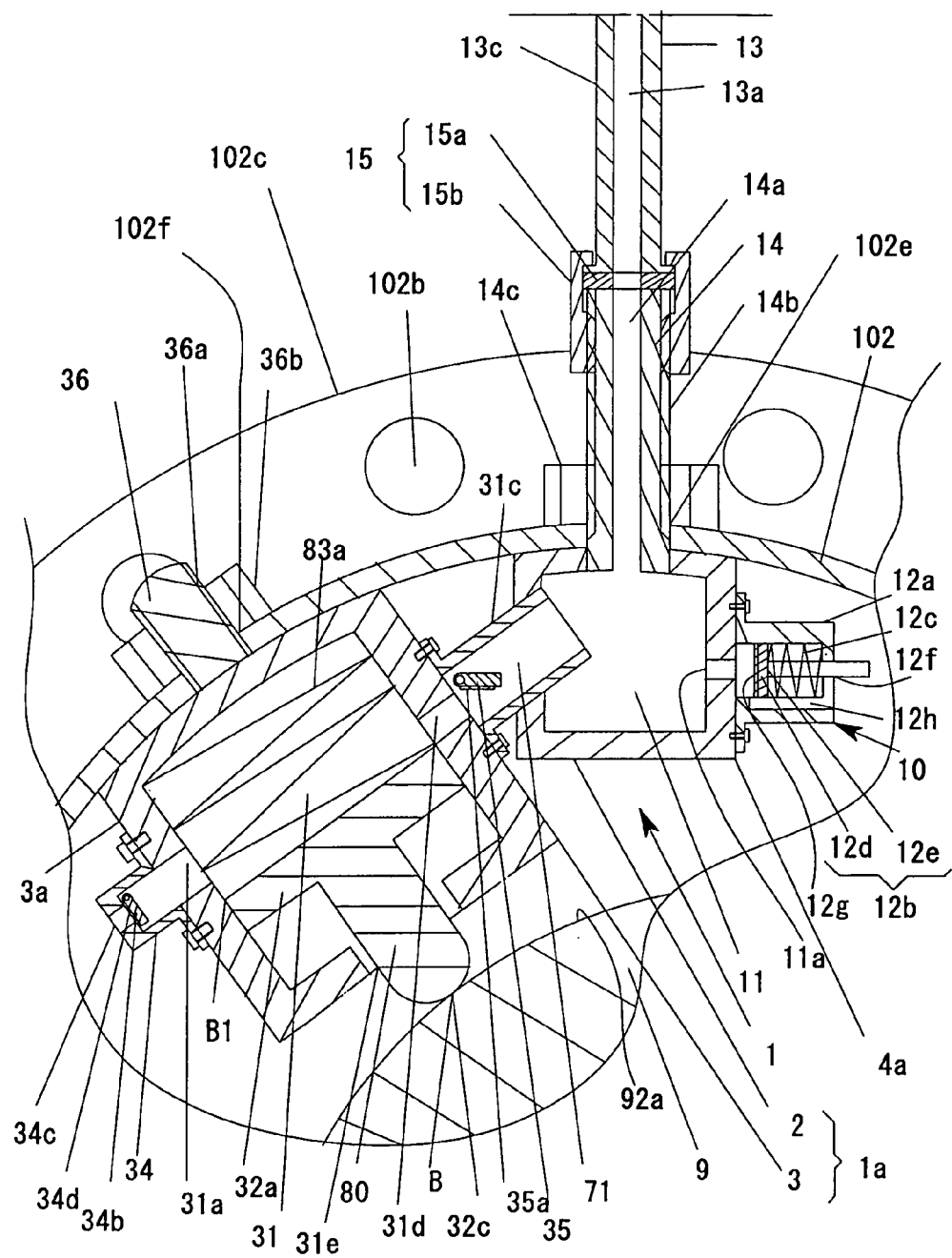
FIG. 10 is a cross-sectional explanatory view illustrating the state where air in a compression chamber is compressed in the third embodiment.

In the automatic air supply mechanism for a pneumatic tire for a bicycle of the third embodiment constituted as above, when the pneumatic tire 103 is rotated with respect to the axle 101 and the cam contact part 32c of the piston rod 80 is slid on the cam face 92a from a small radius part A to a large radial part B by the rotation of the pneumatic tire 103 as shown in FIG. 8, the sliding part 32a is slid in the compression chamber 31 from a bottom dead center position A1 shown in FIG. 9 to a top dead center position B1 shown in FIG. 10. Thereby, the air in the compression chamber 31 is compressed. When the air in the compression chamber 31 is compressed, the check valve 35 is pressed to open the air feeding port 31d and the valve body 34b in the suction hole 31a is pressed toward the air intake port 34c and closes the air intake port 34c. Thereby, the air compressed in the compression chamber 31 is fed to the constant pressure maintaining chamber 11 through the air feeding port 31d.

As air is fed from the compression chamber 31 to the constant pressure maintaining chamber 11, the air pressure in the constant pressure maintaining chamber 11 increases and the valve body 12b is pressed by the air pressure in the constant pressure maintaining chamber 11. Then, when the pressing force caused by the pressure of the air in the constant pressure maintaining chamber 11 becomes greater than the urging force of the urging member 12c, the valve body 12b start sliding in the cylinder part 12a and opens the exhaust port 11a. Thereby, the exhaust port 11a and the air vent hole 12h are communicated with each other and air escapes to the outside through the exhaust port 11a and the air vent hole 12h.

Thus, the air pressure in the constant pressure maintaining chamber 11 can be adjusted to a value at which the force applied to the valve body 12b by the air pressure and a force applied to the valve body 12b by the urging force of the urging member 12c can be balanced.

Although the air fed from the compression chamber 31 to the constant pressure maintaining chamber 11 is compressed at a certain compression ratio, the compression ratio in the compression chamber 31 can be adjusted by adjusting the displacement of the sliding part 32a of the piston rod 80 which is movable in the compression chamber 31. However, in order to adjust the displacement of the sliding part 32a, the design of the cam face 92a or the capacity of the casing 3c must be changed, so that the adjustment of the displacement of the sliding part 32a is difficult and troublesome. In addition, it is difficult to finely adjust the displacement of the slider part 32a.

Thus, when such constant pressure adjusting means is provided, the air pressure in the constant pressure maintaining chamber 11 can be maintained at a prescribed value without adjusting the compression ratio in the compression chamber 31.

Thereafter, the cam contact part 32c of the piston rod 80 is pressed against the cam surface 92a by the urging force of the coil spring 83a and slid on the cam face 92a from the large radius part B to he small radius part A. Thereby, the sliding part 32a is slid to the bottom dead center position A1 in the compression chamber 31. By the sliding movement of the sliding part 32a, a suction force is generated in the compression chamber 31 and. The suction force allows the check valve 35 to close the air feeding port 31d while allowing the suction valve 34 in the suction hole 31 to open the air intake port 34c. Thereby, air is sucked into the compression chamber 31 from the outside.

Description will be made of a fourth embodiment of this invention based on FIG. 11 to FIG. 15. The fourth embodiment is an automatic air supply mechanism for a pneumatic tire for a car, and is provided on a car wheel 200.

The car wheel 200 has an axle 202, a wheel body 210 rotatable with respect to the axle 202, and an automatic air supply mechanism 300.

The wheel body 210 has a wheel hub 203 rotatably attached to the axle 202, a tire wheel 212, and a pneumatic tire 211.

The wheel hub 203 has an inner wheel 204, and an outer wheel 205. The inner wheel 204 is constituted of a right inner wheel 204a and a left inner wheel 204b. The right inner wheel 204a and the left inner wheel 204b are mounted on the axle 202 and secured thereto with a securing nut 202a threaded on the axle 202. The outer wheel 205 of the wheel hub 203 corresponds to the hub 102 in the first embodiment.

The outer wheel 205 has an outer periphery having a disk-shaped wheel fitting part 207. The inner wheel 204 is inserted inside the inner periphery of the outer wheel 205, and the outer wheel 205 is rotatably attached to the inner wheel 204 via steel balls 206, . . . , 206 reliably interposed therebetween.

The tire wheel 212 has a fitting hole 212a for use in attaching it to the outer wheel 205 of the wheel hub 203 at a radially inner position. A fitting bolt 216 is inserted through the fitting hole 212a and threaded into a screw hole 205a formed in the outer wheel 205 of the wheel hub 203, whereby the tire wheel 212 is secured to the outer wheel 205 of the wheel hub 203. Thereby, the tire wheel 212 is rotatable about the axle 202.

A tire holding part 212c for holding a pneumatic tire 211 is provided on the outer periphery of the tire wheel 212.

When the pneumatic tire 211 is attached to the tire holding part 212c of the tire wheel 212, an air holding section 211a in which air can be held is formed within the pneumatic tire 211. The air holding section 211a is provided with a valve 213.

Figure 13:
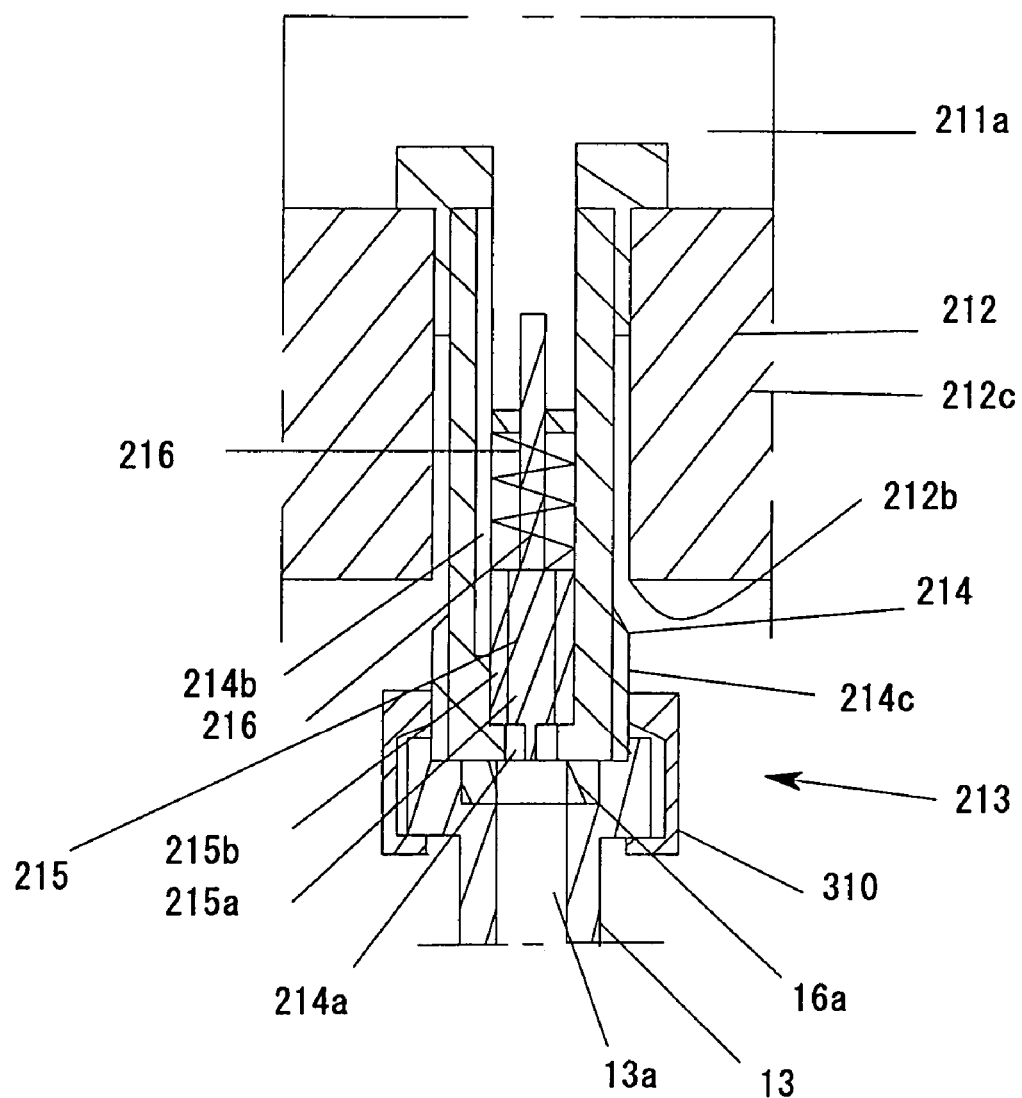
FIG. 13 is an enlarged cross-sectional explanatory view illustrating the state where a pneumatic tire connection section and a valve of a pneumatic tire are connected in the fourth embodiment.

The valve 213 is for getting air into and out of the air holding section 211a, and in this embodiment, has a cylinder body 214 and a check valve 215 as shown in FIG. 13. The cylinder body 214 has a thread part 214c on the outer periphery. The cylinder body 214 has a base end side on the upper side as seen in the drawing attached in the valve fitting hole 212b formed in the tire holding part 212c of the tire wheel 212, whereby the air holding section 211a is communicated with the outside through the cylinder body 214.

The cylinder body 214 has a distal end side on the lower side as seen in the drawing provided with an air intake port 214a and protruded radially inward from the tire wheel 212. The cylinder body 214 has a valve hole 214b formed in the inner periphery thereof. The valve hole 214b is formed in the inner periphery of the cylinder body 214 in the axial direction thereof from the base end to a point in the vicinity of the air intake port 214a.

The check valve 215 has a shut-off part 215a for shutting off the communication between the valve hole 214b and the air intake port 214a. A rubber packing 215b is provided on the outer periphery of the shut-off part 215a. The check valve 215 is disposed in the cylinder body 214 for sliding movement in the axial direction of the cylinder body 214 and constantly urged by a coil spring 216 provided in the cylinder body 214 toward the distal end of the cylinder body 214. Thereby, the communication between the valve hole 214b and the air intake port 214a is shut off.

Figure 14:
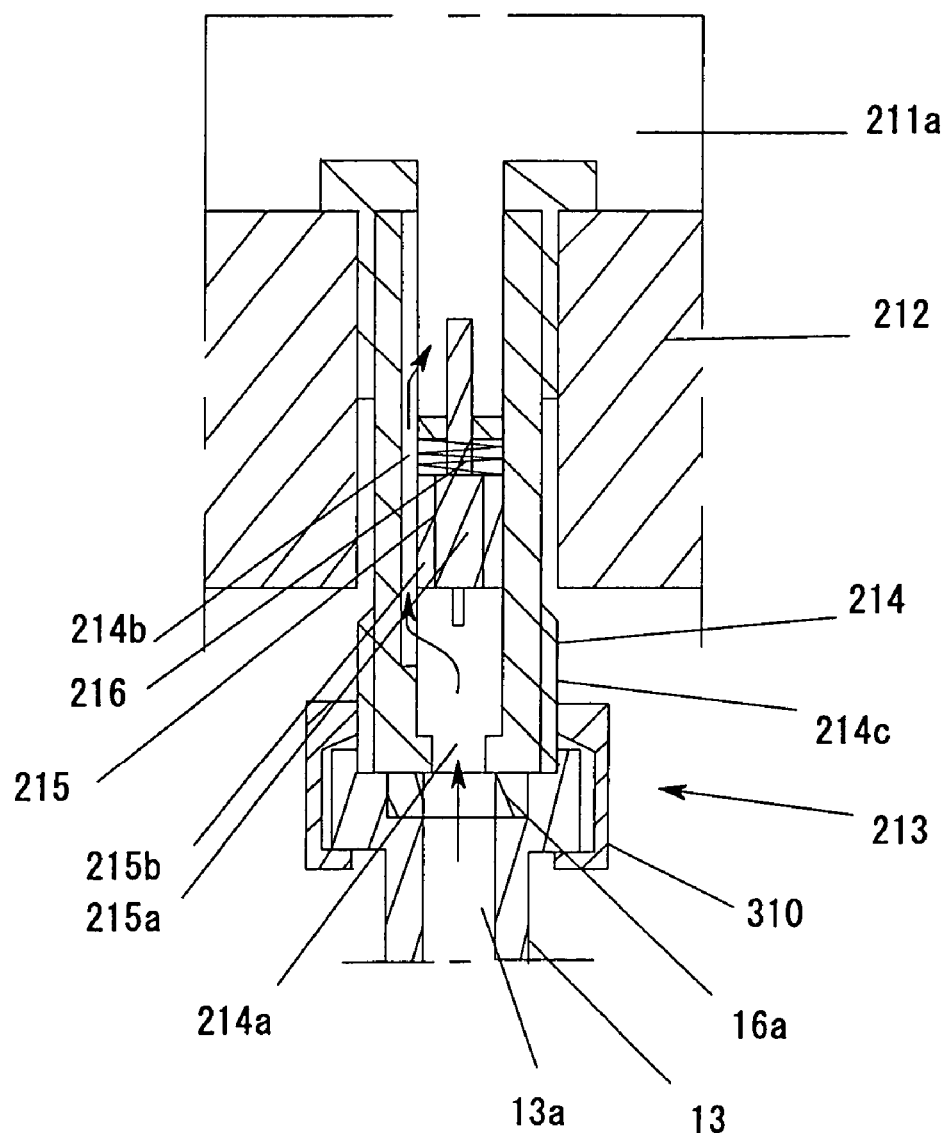
FIG. 14 is an enlarged cross-sectional explanatory view illustrating the state where the air pressure in a constant pressure maintaining chamber is so higher than that in a pneumatic tire that the air in the constant pressure maintaining chamber is pressing a valve of the pneumatic tire and flowing into the pneumatic tire.

Thereby, the air in the air holding section 211a is prevented from escaping to the outside. When air is fed through the air intake port 214a with an air pump or the like, the check valve 215 is slid in the cylinder body 214 toward the air holding section 211a against the coil spring 216 as shown in FIG. 14, whereby the valve hole 214b and the air intake port 214a are communicated with each other, allowing air to be fed into the air holding section 211a through the air intake port 214a.

Figure 12:
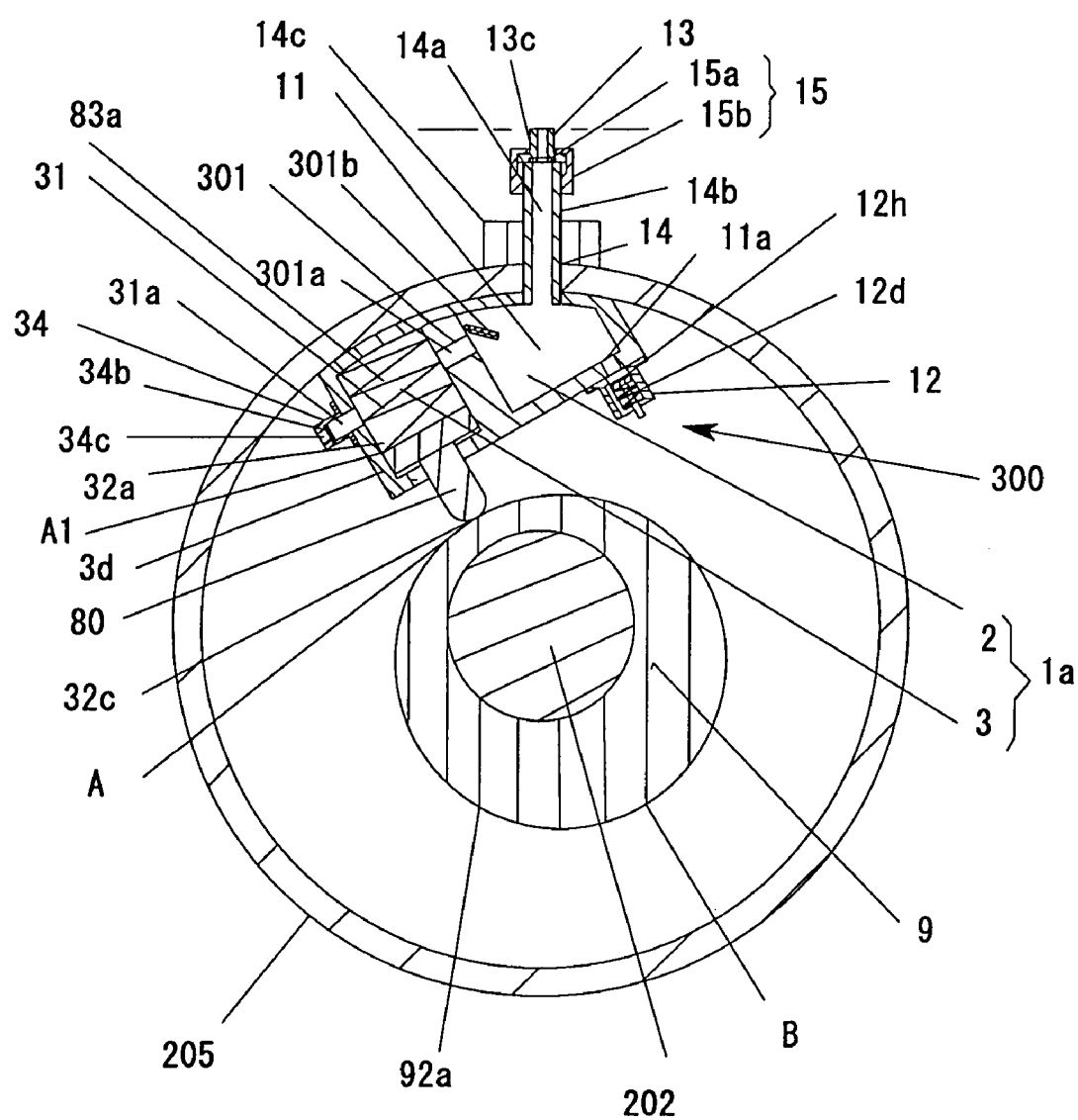
FIG. 12 is an enlarged cross-sectional explanatory view taken along the line XII—XII in FIG. 11.

As shown in FIG. 12, the automatic air supply mechanism 300 for a pneumatic tire for a car of the fourth embodiment has an air feeding section 1a for feeding air into the pneumatic tire 103 as in the case with the automatic air supply mechanism 1 for a pneumatic tire for a bicycle of the first to third embodiments. The air feeding section 1a has a constant pressure maintaining section 2 for maintaining air pressure at a constant value and a compression section 3 for compressing air and feeding the compressed air into the constant pressure maintaining section 2.

The constant pressure maintaining section 2 has a constant pressure maintaining chamber 11, a pressure adjusting section 12, and a connection section 13 for connecting the constant pressure maintaining chamber 11 and the pneumatic tire 211 in air flow communication. The pressure adjusting section 12 has the same constitution as the pressure adjusting section in the third embodiment.

The connection section 13 has a constitution which is generally the same as the connection section in the third embodiment. The connecting section 13 in the fourth embodiment, however, has pneumatic tire connection means having an engaging nut 310 as shown in FIG. 13. In the third embodiment, the distal end side of the connection section 13 is connected to the air holding tube 103b using the valve fixing nut 106d provided to an air holding tube 103b for an ordinary bicycle.

The valve 213 of the pneumatic tire 211 for an ordinary car used in the fourth embodiment, however, is not provided with a valve fixing nut 106d. Thus, in the fourth embodiment, the connection section 13 is provided with an engaging nut 310 so that the distal end side of the connection section 13 can be removably connected to the air holding section 211a of the pneumatic tire 211 by threading the engaging nut 310 on the thread part 214c of the cylinder body 214 of the car wheel. The other configurations of the connection section 13 are the same as those of the connection section in the third embodiment.

As shown in FIG. 12, the compression section 3 has a compression chamber 31 and compression operation means for performing operations to compress the air in the compression chamber 31. The compression operation means has a piston rod 80 and a cam 9. The piston rod 80 has the same constitution as the piton rod in the third embodiment.

The cam 9 in the fourth embodiment has the same constitution as the cam in the third embodiment. The cam 9 in the fourth embodiment, however, is mounted on the axle 202 and disposed between the left inner wheel 204a and the right inner wheel 204b as shown in FIG. 11. By tightening a securing nut 202a, the cam 9 is clamped between the left inner wheel 204a and the right inner wheel 204b and thereby secured to the axle 202.

As shown in FIG. 12, the constant pressure maintaining chamber 11 and the compression chamber 31 of the compression section 3 in the fourth embodiment are constituted of a box-shaped casing 3d. The inside of the casing 3d is partitioned into the constant pressure maintaining chamber 11 and the compression chamber 31 of the compression section 3 by a partition 301.

The partition 301 is provided with a communication hole 301a for communicating the compression chamber 31 and the constant pressure maintaining chamber 11 and feeding air in the compression chamber 31 into the constant pressure maintaining chamber 11, and a check valve 301b as backflow preventing means for preventing the air having entered the compression chamber 31 from the constant pressure maintaining chamber 11 from flowing back to the compression chamber 31. The check valve 301b in the fourth embodiment is rotatably attached on the partition 301 on the side of the constant pressure maintaining chamber 11.

When the check valve 301b receives an air pressure from the compression chamber 31, the lower end of the check valve as seen in FIG. 12 is rotated about the upper end thereof toward the constant pressure maintaining chamber 11. Thereby, the communication hole 301 is opened to communicate the compression chamber 31 and the constant pressure maintaining chamber 11. The check valve 301b, when receiving an air pressure from the constant pressure maintaining chamber 11, is pressed against the partition 301, whereby the communication hole 301a is closed and the communication between the compression chamber 31 and the constant pressure maintaining chamber 11 is shut off. The check valve 301b is constantly urged toward the partition 301 by a coil spring as in the case with the check valve in the first embodiment, although not shown.

The constant pressure maintaining chamber 11 of the constant pressure maintaining section 2 and the compression chamber 31 of the compression section 3 are located between the inner wheel 204 and the outer, wheel 205 of the wheel hub 203, and the fitting part 14 of the constant pressure maintaining section 2 is fixed to the outer wheel 205 via a fixing nut 14c. Thus, the constant pressure maintaining section 2 and the compression section 3 are rotated together with the outer wheel 205 with respect to the inner wheel 204 and the axle 202.

In the automatic air supply mechanism for a pneumatic tire for a car of the fourth embodiment constituted as above, when the car runs and the wheel body 201 is rotated with respect to the axle 202, air is compressed in the compression chamber 31 and fed into the constant pressure maintaining chamber 11.

As shown in FIG. 13, the air in the constant pressure maintaining chamber 11 presses the check valve 215 of the valve 213 of the pneumatic tire 211 from the distal end side toward the base end side thereof (from the lower side toward the upper side as seen in the drawing). When the pressing force caused by the air pressure in the constant pressure maintaining chamber 11 and pressing the check valve 215 is greater than the force pressing the check valve 215 from the base end side toward the distal end side (from the upper side toward the lower side as seen in the drawing), which is the total of the urging force of the urging member 216 and pressing force caused by the air pressure in the air holding section 211a of the pneumatic tier 211, the check valve 215 is slid in the cylinder body 214 toward the base end thereof as shown in FIG. 14. Thereby, the valve hole 214b of the cylinder body 214 and the air intake port 214a are communicated with each other, and the air in the constant pressure maintaining chamber 11 flows into the air holding section 211a of the pneumatic tire 211 through the valve hole 214b.

Then, when the air pressure in the air holding section 211a of the pneumatic tire 211 increases and the force pressing the check valve 215, which is the total of the urging force of the urging member 216 and the pressing force caused by the air pressure in the pneumatic tire 211, increases, the check valve 215 is gradually slid toward the distal end. When the total of the forces becomes equal to the pressing force caused by the air pressure in the constant pressure maintaining chamber 11, the sliding movement of the check valve 215 is stopped.

Figure 15:
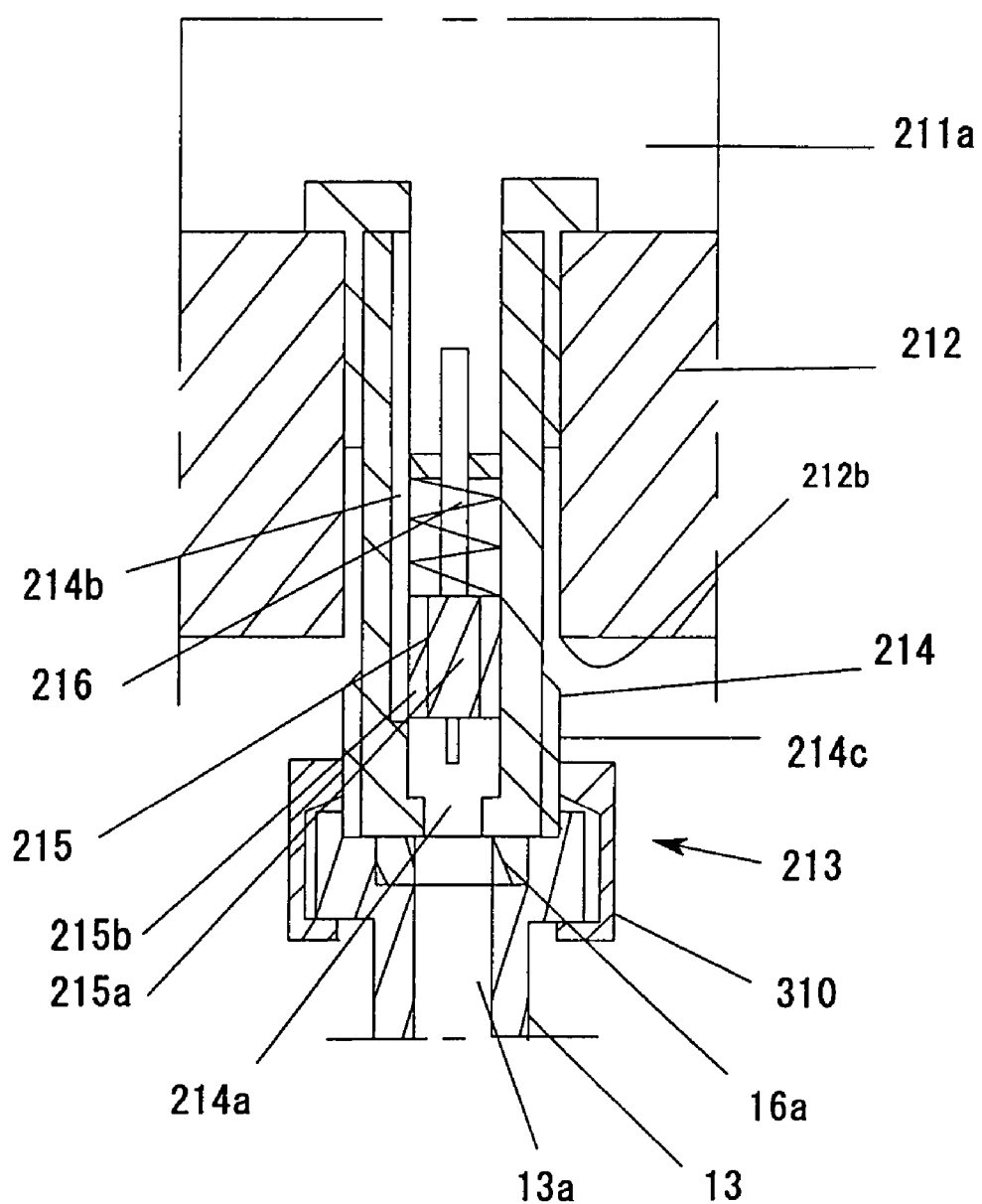
FIG. 15 is an enlarged cross-sectional explanatory view illustrating the state where the air pressures in the constant pressure maintaining chamber and the pneumatic tire have become equal.

In this state, the distal end of the shut-off part 215a of the check valve 215 is generally in the same position as the distal end of the valve hole 214b as shown in FIG. 15 and maintained in the position. Thus, when the air pressure in the air holding section 211a of the pneumatic tire 211 decreases from the state and the check valve 215 is slightly slid in the cylinder body 214 toward the base end thereof, the valve hole 214b of the cylinder body 214 and the air intake port 214a are communicated with each other, and the air in the constant pressure maintaining chamber 11 instantaneously enters the air holding section 211a of the pneumatic tire 211. Thereby, the air pressure in the air holding section 211a of the pneumatic tire 211 can be always maintained at a constant value.

When the connection section 13 has to be removed after the air pressure in the air holding tube 103b has been adjusted to a prescribed value with the automatic air supply mechanism 1, the engaging nut 15b of the constant pressure maintaining chamber connection section 15 is operated and removed from the fitting part 14 and the engaging nut 310 of the pneumatic tire connection section 16 is operated and removed from the valve 213 of the pneumatic tire 211.

Thereby, the connection section 13 can be removed. After the connection section 13 has been removed, since the communication between the valve hole 214b and the air intake port 214a are shut off by the valve 213 and the air in the air holding section 211a can be prevented from escaping through the air intake port 214a, the pneumatic tire 211 can be used in the same manner as a conventional pneumatic tire.

Description will be made of a fifth embodiment based on FIG. 17 and FIG. 18. A piston rod 8 in the fifth embodiment has a rod body 800 having a sliding part 32a and a cam contact part 810 removably attached to the rod body 800. The cam contact part 810 has a plurality of rolling members 801, . . . , 801 in rolling contact with the cam 9 and a connection member 802 connecting the rolling members 801, . . . , 801.

The cam 9 is constituted of a plate cam having a circular contour as in the case with the cam in the second embodiment. The contour of the cam 9 constitutes a cam face 901 with which the rolling members 801, . . . , 801 are in rolling contact.

The cam 9 in this embodiment is secured to an axle 101 by cam securing nuts 45 and 45 on the left of the rod body 800 at a prescribed distance from the rod body 800 in the axial direction of the axle 101.

The rolling members are constituted of three rollers 801, . . . , 801 in this embodiment. The three rollers 801, . . . , 801 are connected by the connection member 802.

The connection member 802 is constituted of a pair of right and left disk-like plate members 803a and 803b. The plate members 803a and 803b are engaged with each other by engaging pins 804, . . . , 804 with a space therebetween. The rollers 801, . . . , 801 are arranged at generally equal intervals along the periphery of the cam 9 such that that the center angle (a) about the center O1 of the cam 9 formed between two adjacent rollers 801 and 801 is approximately 120 degrees and rotatably supported between the plate members 803a and 803b via roller shafts 805, . . . , 805.

Thereby, the rollers 801, . . . , 801 are in rolling contact with a cam face 901 of the cam 9 and relatively immovable in the radial direction of the cam 9 with respect to the cam face 901 of the cam 9. The rollers 801, . . . , 801 are held immovable in the axial direction of the axle 101 with respect to the cam 9 by collars 902 and 902 protruded outward from the both sides of the cam face 901 of the cam 9.

Each of the roller shafts 805, . . . , 805 extends through the right plate member 803b and protrudes rightward to form a protruding part 805a extending in the axial direction of the axle 101. The protruding part 805a of one of the roller shafts 805, . . . , 805 (the upper one in the example shown in FIG. 17 and FIG. 18) is removably inserted in a shaft insertion hole 811 formed in the rod body 800. Thereby, the cam contact part 810 and the rod body 800 are removably connected to each other with the cam contact part 810 located on one side in the axial direction of the axle 101 with respect to the rod body 800.

Figure 17:
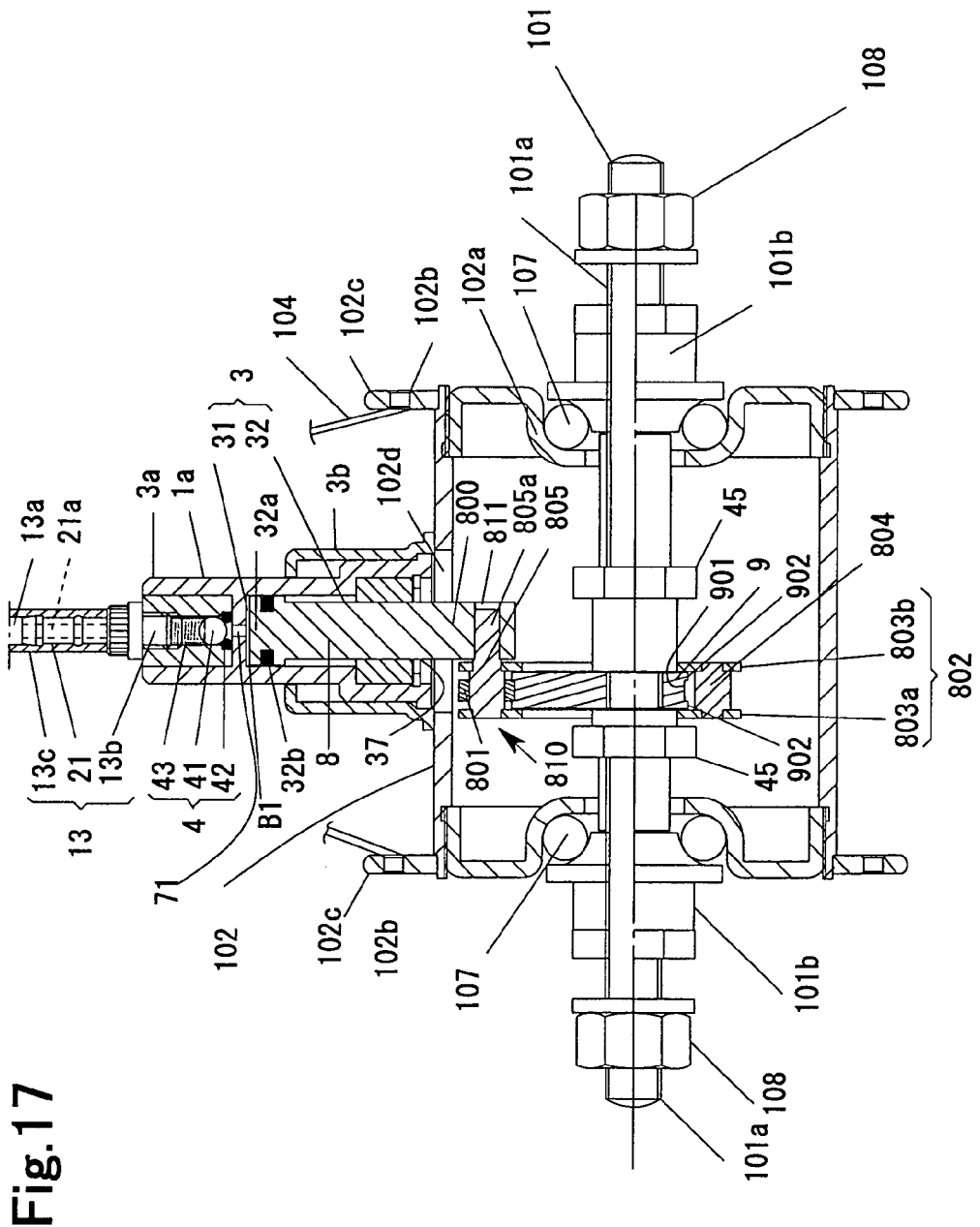
FIG. 17 is a side view of a bicycle wheel provided with an automatic air supply mechanism for a pneumatic tire according to a fifth embodiment.
Figure 18:
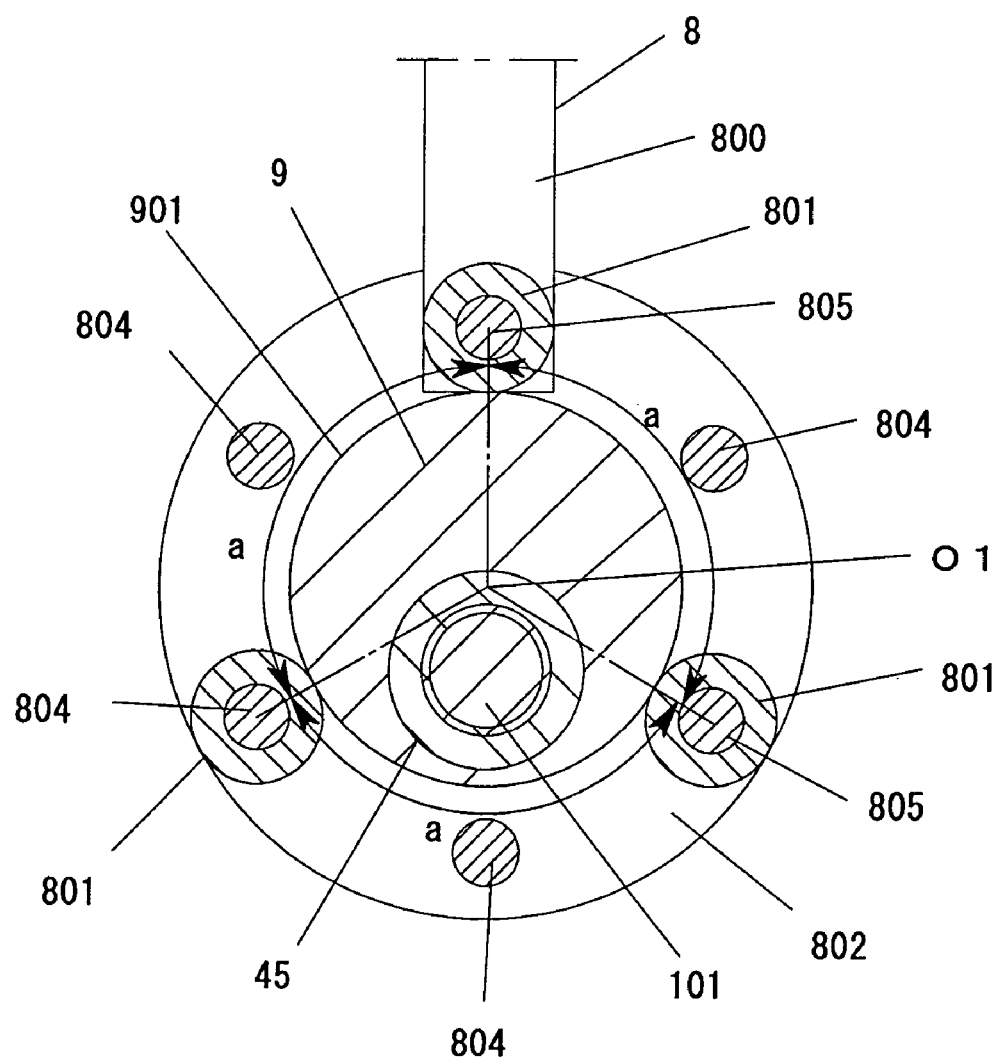
FIG. 18 is an enlarged cross-sectional explanatory view of essential parts of a cam and a cam contact part in the fifth embodiment.

In this embodiment, the hub 102 has a piston introducing hole 102d, through which the rod body 800 extends as shown in FIG. 17, formed such that the rod body 800 is movable in the axial direction of the axle 101. Thereby, in order to release the connection between the cam contact part 810 and the rod body 800, the fixing between the casings 3a and 3b to which the rod body 800 has been assembled and the hub 102 is released and then the casings 3a and 3b are moved toward the opposite side to the cam 9 in the axial direction of the axle 101. Thereby, the protruding part 805a of the roller shaft 805 is removed from the shaft insertion hole 811 of the rod body 800, allowing disconnection of them.

In order to connect the cam contact part 810 and the rod body 800, the above operation is reversed. Namely, by moving the casings 3a and 3b to which the rod body 800 has been assembled are moved toward the cam 9 in the axial direction of the axle 101, the protruding part 805a of the roller shaft 805 can be inserted into the shaft insertion hole 811 of the rod body 800, allowing connection of them.

Thus, when a trouble occurred in the casing 3a or 3b, the casing 3a and 3b can be removed from the hub 102 by operating the casings 3a and 3b to which the rod body 800 has been assembled to release the connection between the rod body 800 and the cam contact part 810, and inspection and repair in the casing 3a and 3b can be performed without disassembling the hub. This makes maintenance easy.

Also, since the cam contact part 810 is located on one side in the axial direction of the axle 101 with respect to the rod body 800, the entire length of the piston rod 8 can be shortened and the height of the casings 3a and 3b can be reduced. Thereby, the length of the casings 3a and 3b protruding from the hub 102 can be reduced, making them compact.

The number of the rollers 801, . . . , 801 is not limited to three. The rollers 801, . . . , 801 can be constituted of at least two, preferably at least three, rollers. Also, the rollers 801, . . . , 801 have not necessarily be disposed circumferentially at equal intervals as long as each of the rollers 801 and 801 are relatively immovable in the radial direction of the cam 9 with respect to the cam 9. More specifically, when the number of the rollers is three or more, the rollers 801, . . . , 801 are arranged such that the center angle (a) about the center of the cam 9 formed between adjacent two rollers 801 and 801 is smaller than 180 degrees. When the number of the rollers is two, the two rollers 801 and 801 are arranged such that the center angle (a) about the center of the cam 9 formed between them is 180 degrees.

The rolling members are not limited to the rollers 801, . . . , 801 and may be modified as needed. For example, the rolling members may be constituted of steel balls. Although the rod body 800 and the roller shaft 805 are connected in the above embodiment, an insertion shaft which can be removably inserted into the shaft insertion hole 811 of the rod body 800 may be formed on the connecting member 810, and inserted into the shaft insertion hole 811 of the rod body 800.

The other configurations of the fifth embodiment are the same as those of the first embodiment. The above is the description of the fifth embodiment.

Description will be made of an automatic air supply mechanism for a pneumatic tire of a sixth embodiment based on FIG. 19 to FIG. 23. An automatic air supply mechanism 1 of the sixth embodiment is one for a bicycle attached to a bicycle wheel 100 as in the case with the automatic air supply mechanisms of the first to third and fifth embodiments.

A compression operation body in the automatic air supply mechanism 1 for a bicycle of the sixth embodiment has a piston rod 980 and a cam 984 as in the case with the first embodiment. The piston rod 980 has a sliding part 32a slidable in a compression chamber 31 and a cam contact part 981 in contact with a cam 984. The cam contact part 981 has a roller shaft 983 and a roller 982 rotatably supported by the roller shaft 983 and rollable on a hereinafter described cam face 984a provided on a cam 984.

The cam 984 has a cam body 985 having the cam face 984a in contact with the roller 982 and a shaft support member 986 for supporting the roller shaft 983. The shaft support member 986 has a disk shape and has a shaft insertion hole 986a for receiving the roller shaft 983. The shaft support member 986 is rotatably supported on one side of the cam face 984a of the cam body 985. The roller shaft 983 is removably inserted in the shaft insertion hole 986a.

The compression chamber 31 in which the sliding part 32a of the piston rod 980 is slidable is formed in a cylindrical casing 931 having a circular cross-section. The cylindrical casing 931 has an upper outer periphery on which a cylindrical casing operation member 932 is attached.

The casing operation member 932 has an inside wall provided with a plurality of protrusions 932a extending over a prescribed length in the axial direction thereof. Although not shown, the protrusions 932a are formed around the entire inside wall of the casing operation member 932.

The protrusions 932a are fitted in a plurality of fitting grooves 931a formed in the upper outer periphery of the cylindrical casing 931. Thereby, the casing operation member 932 is not rotatable with respect to the cylindrical casing 931, and the cylindrical casing 931 are rotated together with the casing operation member 932 along with rotation thereof.

The casing operation member 932 fitted on the upper periphery of the cylindrical casing 931 as above is pressed from above and secured by a securing nut member 933 provided on the upper side of the cylindrical casing 931. Thereby, the casing operation member 932 is immovable vertically with respect to the cylindrical casing 931.

The cylindrical casing 931 is supported by a cylindrical casing support member 109.

Figure 20:
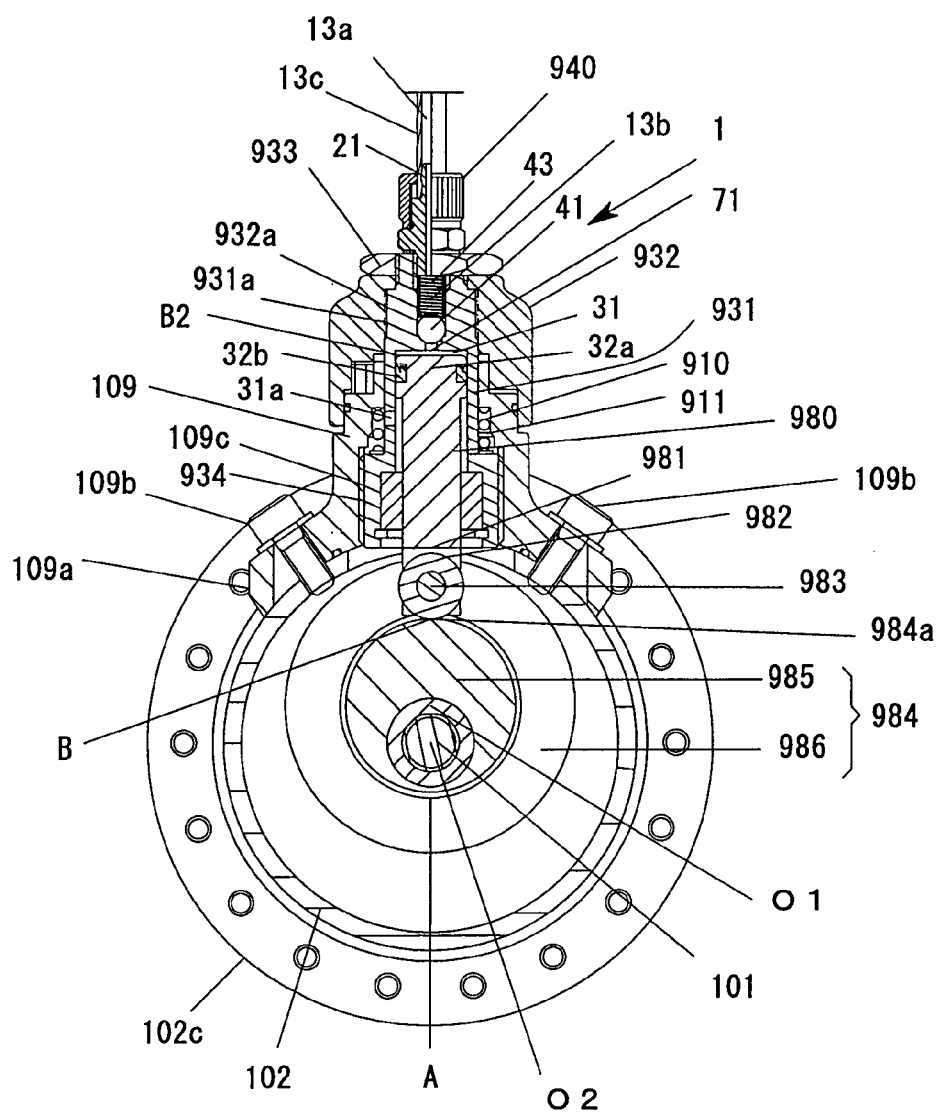
FIG. 20 is a cross-sectional explanatory view taken along the line XX—XX in FIG. 19.

As shown in FIG. 20, the casing support member 109 has hub mounting parts 109a and 109a at its lower part, which are secured to the outer periphery of the hub 102 via bolts 109b and 109b. The casing support member 109 has an inside wall on which a female thread part 109c for supporting the cylindrical casing 931 is provided. The female thread part 109c is engaged with a male thread part 934 provided on a lower outer periphery of the cylindrical casing 931.

Thereby, the cylindrical casing 931 is rotatably supported on the outer periphery of the hub 102 via the casing support member 109. When the cylindrical casing 931 is rotated with respect to the casing support member 109, the compression chamber 31 in the cylindrical casing 931 is moved in a direction generally perpendicular to the axis of the axle 101 and moved closer to or away from the axle 101. Since the piston rod 980 is connected to the cam 984, the sliding part 32a of the piston rod 980 is not moved and the compression chamber 31 is moved with respect to the sliding part 32a of the piston rod 980 when the compression chamber 31 is moved.

Figure 21A:
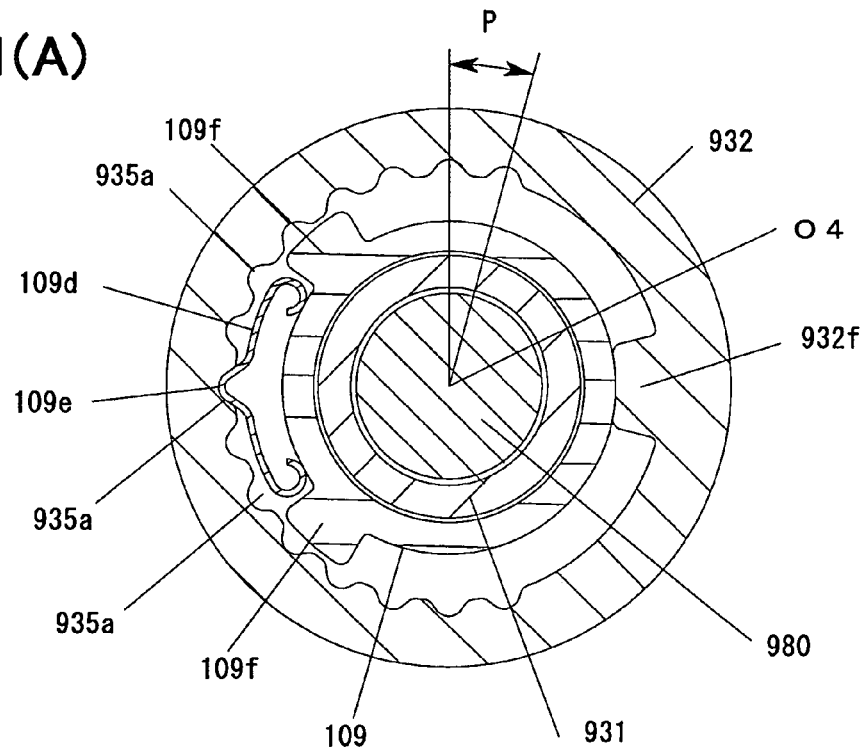
FIG. 21(A) is an enlarged cross-sectional explanatory view taken along the line XXI—XXI in FIG. 19.
Figure 21B:
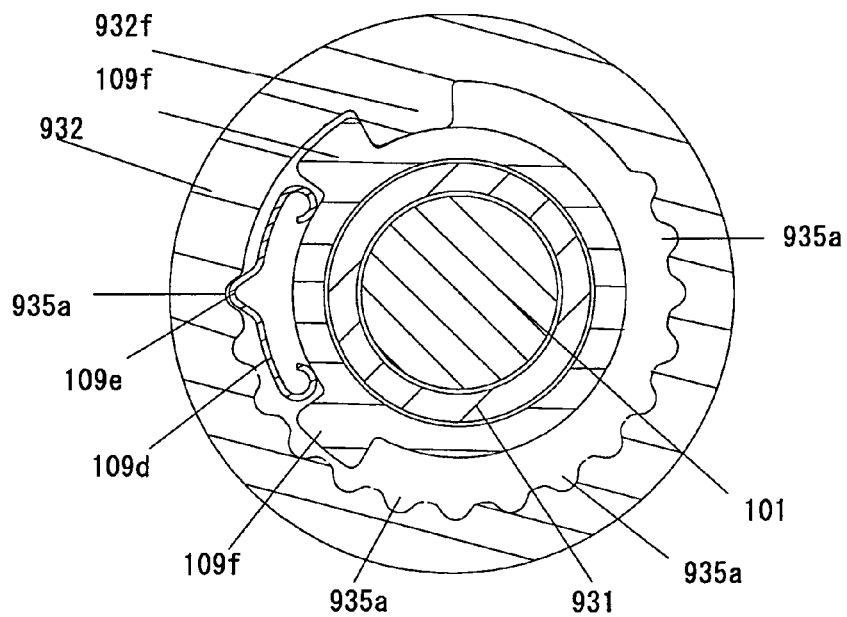
FIG. 21(B) is an enlarged cross-sectional explanatory view illustrating the positional relation between a casing operation member and a casing support member after an operation to rotate a compression chamber to reduce the compression ratio therein.

In this embodiment, the rotation of the cylindrical casing 931 with respect to the casing support member 109 is regulated by rotation amount regulating means. As shown in FIG. 21(A), the rotation amount regulating means comprises two protruding pieces 109f and 109f formed on the outer periphery of the casing support member 109 in circumferentially spaced relation, and a contact piece 932f formed on the inner periphery of the casing operation member 932. The contact piece 932f of the casing operation member 932 is located between the protruding pieces 109f and 109f. The cylindrical casing 931 is rotatable with respect to the casing support member 109 between a position where it abuts on one protruding piece 109f and a position where it abuts on the other protruding piece 109f. In this embodiment, the cylindrical casing 931 is configured to be rotatable through approximately 120 degrees with respect to the casing support member 109.

In this embodiment, there is provided fastening means having a plurality of positions for removably fastening the cylindrical casing 931 and the casing support member 109. As shown in FIG. 21(A), the fastening means comprises an fastening member 109d provided on the outer periphery of the casing support member 109 and fastening member receiving parts 935a, . . . , 935a provided on the inside wall of the casing operation member 932.

The fastening member 109d is constituted of an elastic plate spring and has a protrusion 109e. The fastening member 109d is received between the two protruding pieces 109f and 109f of the casing support member 109 such that it is circumferentially immovable. In this state, the protrusion 109e protrudes radially outward.

The fastening member receiving parts 935a, . . . , 935a are constituted of a plurality of recesses formed along the periphery of the casing support member 932 at equal intervals. Each fastening member receiving part 935a is a recess formed on the inside wall of the casing operation member 932 and having such a shape as to be able to receive and fasten the protrusion 109e.

As shown in FIG. 20, the cylindrical casing 931 is urged in a direction closer to the axle 101 by a coil spring 910 as a cylindrical casing urging member. The coil spring 910 is received in a spring receiving part 911 formed between the outside wall of the cylindrical casing 931 and the inside wall of the casing support member 109, and constantly urges the cylindrical casing 931 downward as seen in the drawing with respect to the casing support member 109. The urging force of the coil spring 910 allows the cylindrical casing 931 to be biased in a direction closer to the axle 101 below it by the clearance formed between the male thread part 932 of the cylindrical casing 931 and the female thread part 109c of the casing support member 109 by the threaded engagement therebetween.

Figure 19:
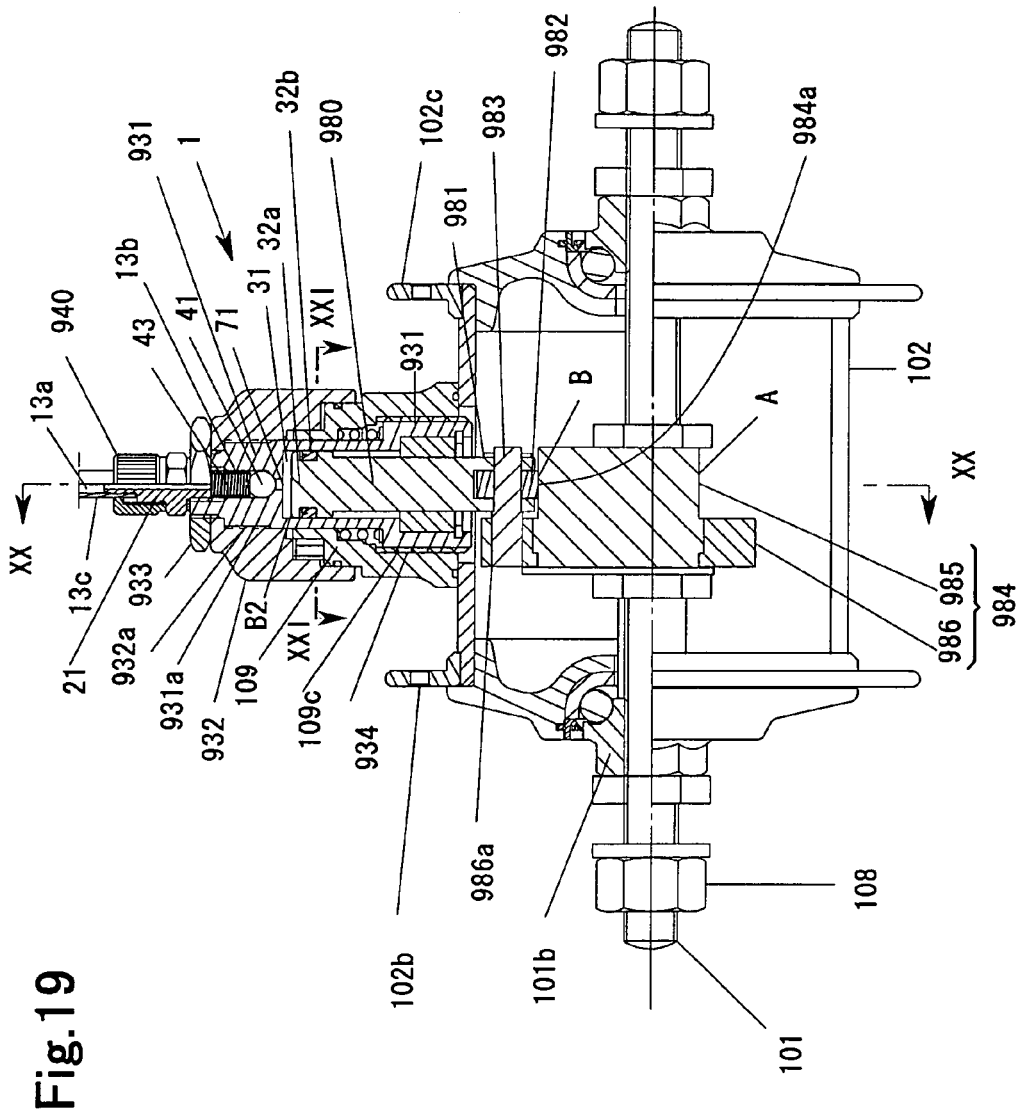
FIG. 19 is an enlarged cross-sectional explanatory view of an essential part of a bicycle wheel provided with an automatic air supply mechanism for a pneumatic tire according to a sixth embodiment of this invention.

In the automatic air supply mechanism 1 for a pneumatic tire of the sixth embodiment constituted as above, when the pneumatic tire 103 is rotated with respect to the axle 101 from the state in which the sliding part 32a of the piston rod 980 is at the top dead center position B2 as shown in FIG. 19 and FIG. 20 by, for example, running the bicycle, the piston rod 980 is rotated together with the hub 102. Along with the rotation, the roller 982 of the piston rod 980 is constantly contacted on the cam face 984a and runs thereon since the roller shaft 983 of the piston rod 980 is received and supported by the shaft support member 986 of the cam 984.

Figure 22A:
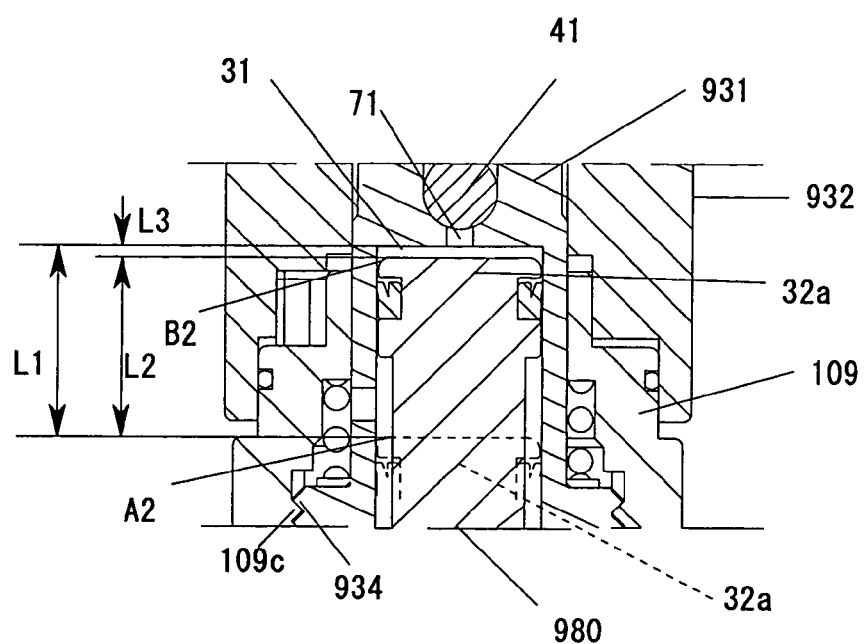
FIG. 22(A) is an enlarged cross-sectional view of a compression section.

Then, as shown in FIG. 22(A), the sliding part 32a of the piston rod 980 is slid in the compression chamber 31 along the inside wall thereof in the direction of the axis thereof from a top dead center position B2 toward a bottom dead center position A2 (shown by dot lines in FIG. 22(A)), and reaches the bottom dead center position A2 when the roller 982 of the piston rod 980 comes to a small radius part A (shown in FIG. 19 and FIG. 20) of the cam face 984a. In this state, the compression chamber 31 is in an expanded state where the capacity L1 therein is largest. Since the capacity of the compression chamber 31 is in proportion with the distance between the upper surface of the compression chamber 31 and the sliding part 32a, the capacity of the compression chamber 31 is represented by the distance between the upper surface of the compression chamber 31 and the sliding part 32a in FIG. 22(A) and hereinafter described FIG. 22(B) for convenience of explanation.

When the pneumatic tire 103 is rotated with respect to the axle 101, the roller 982 of the piston rod 980 runs on the cam face 984a, being pressed thereagainst. By the running, the sliding part 32a of the piston rod 980 is slid in the compression chamber 31 along the inside wall thereof in the axial direction thereof from the bottom dead center position A2 toward the top dead center position B2, and reaches the top dead center position B2 when the roller 982 of the piston rod 980 comes to a large radius part B of the cam face 984a (the state shown in FIG. 19 and FIG. 20). In this state, the compression chamber 31 is in a contracted state having smallest capacity L3, which is smaller than the capacity L1 in the expanded state by a stroke capacity L2 corresponding to the distance the sliding part 32a was moved from the bottom dead center position A2 to the top dead center position B2.

The air in the compression chamber 31 is compressed at a compression ratio obtained by dividing the capacity L1 in the expanded state, which is the total of the stroke capacity L2 and the capacity L3 in the contracted state, by the capacity L3 in the contracted state.

Description will be made of the case where the compression ratio is adjusted. In order to decrease the compression ratio, the casing operation member 932 is rotated counterclockwise from the state shown in FIG. 21(A). Thereby, the male thread part 934 of the cylindrical casing 931 is rotated along the female thread part 109c of the casing support member 109 and the projection 109e of the fastening member 109d is pressed by the wall of the fastening member receiving part 935a, and elastically deformed. The elastic deformation allows the projection 109e to be pushed out of the fastening member receiving part 935a, and received into an adjacent fastening member receiving part 935a. When the casing operation member 932 is further rotated, the projection 109a is received into the next fastening member receiving part 935a. Thereby, the casing operation member 932 can be rotated and positioned with respect to the casing support member 109 in increments of a center angle P about the rotation center O4 of the casing support member 109 formed between two adjacent fastening member receiving parts 935a and 935a. In this embodiment, the casing operation member 932 can be rotated and positioned in increments of 8 degrees. Thus, the rotation of the casing operation member 932 with respect to the casing support member 109d can be adjusted minutely and precisely. At this time, since the cylindrical casing 931 is constantly biased with respect to the casing support member 109 by the clearance between the male thread part 932 of the cylindrical casing 931 and the female thread part 109c of the casing support member 109 by the urging force of the coil spring 910, the cylindrical casing 931 can be moved in the axial direction of the casing support member 109 reliably and precisely in proportion to the amount the cylindrical casing 931 is rotated with respect to the casing support member 109.

Figure 22B:
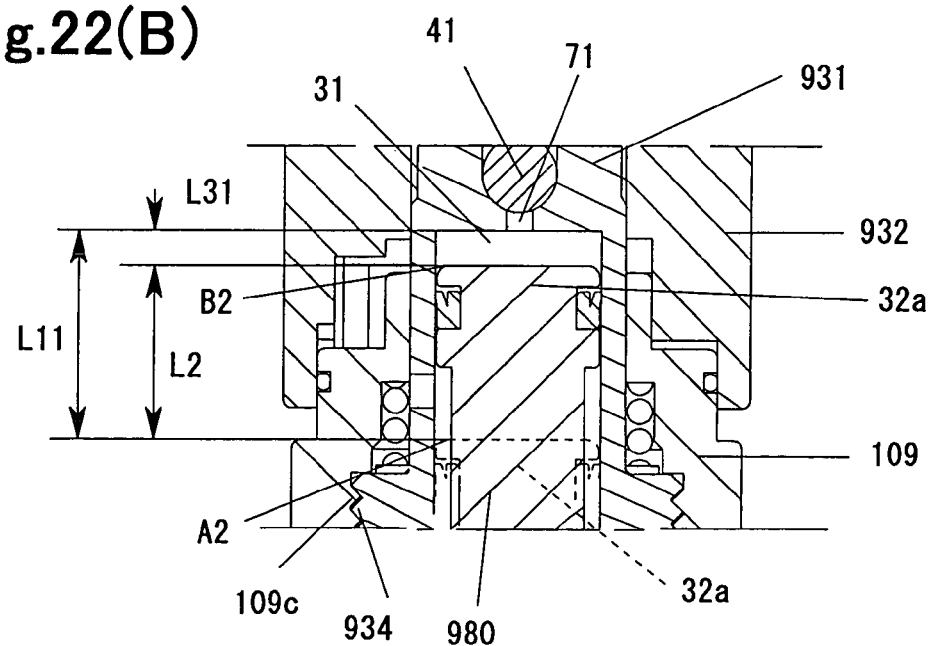
FIG. 22(B) is an enlarged cross-sectional explanatory view of the compression section after the compression ratio therein shown in FIG. 22(A) has been adjusted with compression ratio adjusting means.

Then, when the casing operation member 932 is rotated until the contact piece 932f thereof is brought into contact with the protruding piece 109f, the cylindrical casing 931 having the compression chamber 31 is rotated with respect to the casing support member 109 and, at the same time, moved in a direction away from the axle 101. At this time, the piston rod 980 is not moved since the roller shaft 983 is supported by the shaft support member 986 of the cam 984, and only the cylindrical casing 931 is moved. As a result, as shown in FIG. 22(B), the compression chamber 31 in the contracted state where the sliding part 32a is at the upper dead center position B2 has a capacity L31 which is larger than the capacity L3 in the contracted state before movement shown in FIG. 22(A) by an amount corresponding to the distance the cylindrical casing 931 was moved.

The sliding part 32a is moved to the bottom dead center position A2 from the above state. The compression chamber 31 is shifted into the expanded state having a capacity increased by the stroke capacity L2. Thus, the compression ratio becomes a value obtained by dividing an expanded capacity L11, which is the total of the capacity L31 in the contracted state and the stroke capacity L2, by the capacity L31 in the contracted state. At this time, the stroke capacity L2 is not changed, the compression ratio at this time is greater than that before the movement shown in FIG. 22(A).

In order to increase the compression ratio, the casing operation member 932 is rotated in reverse, namely clockwise, from the state shown in FIG. 21(A). Thereby, the compression ratio can be increased.

The automatic air supply mechanism 1 of the sixth embodiment is provided with a pneumatic tire connecting device 160 for connecting a connection pipe 13c to the pneumatic tire 103. The connection pipe 13c is made of an elastic material as in the case with the connection pipe in the first embodiment and has an air passage 13a therein. The connection pipe 13c has a lower side connected to a connection tube 21 attached to the cylindrical casing 931 as shown in FIG. 19 and FIG. 20. In this embodiment, after being connected to the connection tube 21, the connection pipe 13c is prevented from being removed from the connection tube 21 by an anti-removal nut 940. Since the connecting pipe 13c is connected to the connection tube 21 as described above, the air passage 13a of the connection pipe 13c is connected to the compression chamber 31 via a communication hole 71 and a pressure maintaining space part 13b provided in the cylindrical casing 931 and the connection tube 21.

Figure 23:
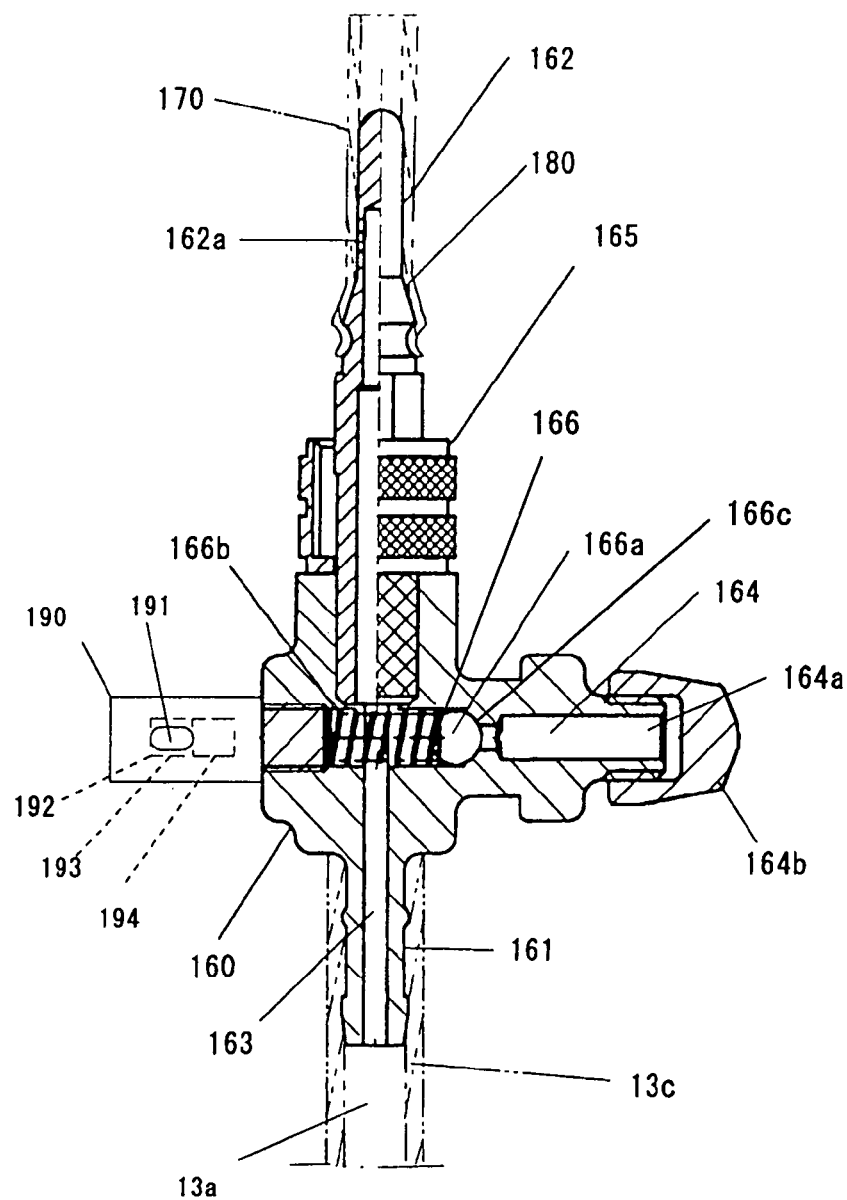
FIG. 23 is an enlarged, partially cross-sectional, side view of a pneumatic tire connecting device.

As shown in FIG. 23, the pneumatic tire connecting device 160 has a pipe connection section 161 removably connectable to the connection pipe 13c at a lower part thereof.

The pneumatic tire connecting device 160 has a tire connection section 180 removably connectable to the pneumatic tire 103 at an upper part thereof. The tire connection section 180 is provided with a valve mounting part 162 to which a check valve 170 can be attached. The valve mounting part 162 in this embodiment is constituted of a rod body having a circular cross-section and can be inserted into a check valve 170 of an elastic synthetic rubber. The valve mounting part 162 has a valve hole 162a opened to communicate a hereinafter described pneumatic tire connecting air passage 163 with the outside.

A fitting nut 165 removably attachable to the valve mounting piece 103c (shown in FIG. 4) provided on the air holding tube 103b of the pneumatic tire 103 is provided below the valve mounting part 162.

The pneumatic tire connecting device 160 has therein a pneumatic tire connecting air passage 163 opened in the axial direction thereof from the pipe connection section 161 to the valve hole 162a of the valve mounting part 162. The pneumatic tire connecting air passage 163 is connected to the air passage 13a of the connection pipe 13c in connecting the pipe connecting part 161 of the pneumatic tire connecting device 160 with the connecting pipe 13c and constitutes a part of an air passage in the connection section 13 of the automatic air supply mechanism 1.

In addition, an air introducing hole 164 is provided between the pipe connection section 161 and the valve mounting part 162 of the pneumatic tire connecting device 160. The air introducing hole 164 is used in supplying air into the pneumatic tire 103 from the outside with an air pump or the like.

The air introducing hole 164 is formed to communicate the pneumatic tire connecting air passage 163 with the outside. The air introducing hole 164 has an air intake port 164a closed with a removable cap 164b.

In the air introducing hole 164 is provided air introducing hole backflow preventing means 166 for preventing backflow of air from the pneumatic tire connecting air passage 163 to the air introducing hole 164. The air introducing hole backflow preventing means 166 has a ball 166a movably disposed in the air introducing hole 164 and a coil spring 166b for urging the ball 166a.

The coil spring 166b always urges the ball 166a toward the air intake port 164a and presses the ball 166a against a ball receiving part 166c provided in the air introducing hole 164. Thereby, the air introducing hole 164 is closed in normal state.

The pneumatic tire connecting device 160 in this embodiment is provided with an air pressure checking device 190 as air pressure checking means for use in checking the air pressure in the pneumatic tire connecting air passage 163. The air pressure checking device 190 in this embodiment has an air pressure receiving part (not shown) for receiving the air pressure in the pneumatic tire connecting air passage 163, an indicating piece 192 which is moved when the air pressure receiving part receives an air pressure which is not lower than a prescribed value, and a window hole 191 for observing the indicating piece 192 from the outside. The indicating piece 192 has a low-pressure indicating part 193 for indicating that the air pressure in the pneumatic tire connecting air passage 163 is not higher than a prescribed value and a high-pressure indicating part 194 for indicating that the air pressure in the pneumatic tire connecting air passage 163 has become higher than the prescribed value. The low-pressure indicating part 193 and the high-pressure indicating part 194 are colored with different colors.

The air pressure checking device 190 constituted as above is attached to the pneumatic tire connecting device 160 with the air pressure receiving part inserted in the pneumatic tire connecting air passage 163. When the air pressure in the pneumatic tire connecting air passage 163 is zero, the low-pressure indicating part 193 coincides with the window hole 191 and appears therein. When the air pressure in the pneumatic tire connecting air passage 163 becomes a prescribed value or higher, the air receiving part receives the air pressure and the indicating piece 192 is moved to the left as seen in FIG. 23. Thereby, the high-pressure indicating part 194 coincides with the window hole 191 and appears therein. When the air pressure in the pneumatic tire connecting air passage 163 is reduced from the state to a prescribed value or lower, the indicating piece 192 is moved to the right as seen in FIG. 23 by an urging force of an urging member (not shown) provided in the air pressure checking device 190.

When the pneumatic tire connecting device 160 constituted as above is used, the connection pipe 13c is attached to the pipe connection section 161 and the check valve 170 is attached to the valve mounting part 162. In this state, the valve hole 162a is covered with the check valve 170 and the pneumatic tire connecting air passage 163 is closed.

In the state, the valve mounting part 162 of the tire connection section 180 is inserted into the valve mounting piece 103c of the air holding tube 103b of the pneumatic tire 103, and then fitting nut 165 is threaded on the thread part of the valve mounting piece 103c. Thereby, the air tire connecting device 160 can be attached to the pneumatic tire 130 with the valve mounting piece 103c closed with the check valve 170.

When the bicycle is run and the pneumatic tire 103 is rotated with respect to the axle 101 in the above state, the air compressed in the compression chamber 31 is fed from the connection pipe 103c to the pneumatic tire connecting air passage 163 as described before. Then, when the air pressure in the pneumatic tire connecting air passage 163 becomes a prescribed value or higher, the pressure receiving part of the pneumatic tire connecting device 160 receives the air pressure and the high-pressure indicating part 194 of the indicating piece 192 appears in the window hole 191. Thus, by checking whether or not the high-pressure indicating part 194 can be seen through the window hole 191, it can be recognized that the air compressed at a prescribed compression ratio in the compression chamber 31 of the automatic air supply mechanism 1 is fed to the pneumatic tire connecting air passage 163, and it can be checked that the automatic air supply mechanism 1 is functioning properly.

When air is fed to the pneumatic tire connecting air passage 163, the check valve 170 closing the valve hole 162a is pushed open, allowing the air to flow into the air holding tube 103b of the pneumatic tire 103.

In order to supply air into the air holding tube 103b of the pneumatic tire 103 with an air pump or the like, the cap 164b is removed and air is fed through the air intake port 164a. Thereby, the ball 166a of the air introducing hole valve 166 is moved toward the pneumatic tire connecting air passage 163 to open the air introducing hole 164 and the air flows into the pneumatic tire connecting air passage 163. Part of the air having entered the pneumatic tire connecting air passage 163 enters the air passage 13a of the connection pipe 13c. However, since the compression chamber 31 side of the air passage 13a is closed by the ball 41 as shown in FIG. 19, the air pushes to open the check valve 170 closing the valve hole 162a and flows from the pneumatic tire connecting air passage 163 into the air holding tube 103b of the pneumatic tire 103.

In the sixth embodiment, the automatic air supply mechanism 1 is provided with the pneumatic tire connecting device 160. This invention, however, is not limited to the above configuration and can be modified as needed. For example, the pneumatic tire connecting device 160 is not attached to the automatic air supply mechanism 1 and may be embodied as a device for the automatic air supply mechanism 1 for connecting it with the pneumatic tire 103. When the pneumatic tire connecting device 160 is embodied as a device for the automatic air supply mechanism 1 for connecting it with the pneumatic tire 103, the pipe connection section 161 serves as an automatic supply mechanism connection section for connecting the pneumatic tire connecting device 160 to the automatic air supply mechanism 1. When the automatic air supply mechanism 1 is provided with the pneumatic tire connecting device 160 as in the above embodiment, the automatic air supply mechanism 1 and the pneumatic tire connecting device 160 may be connected to each other removably or permanently.

Figure 24:
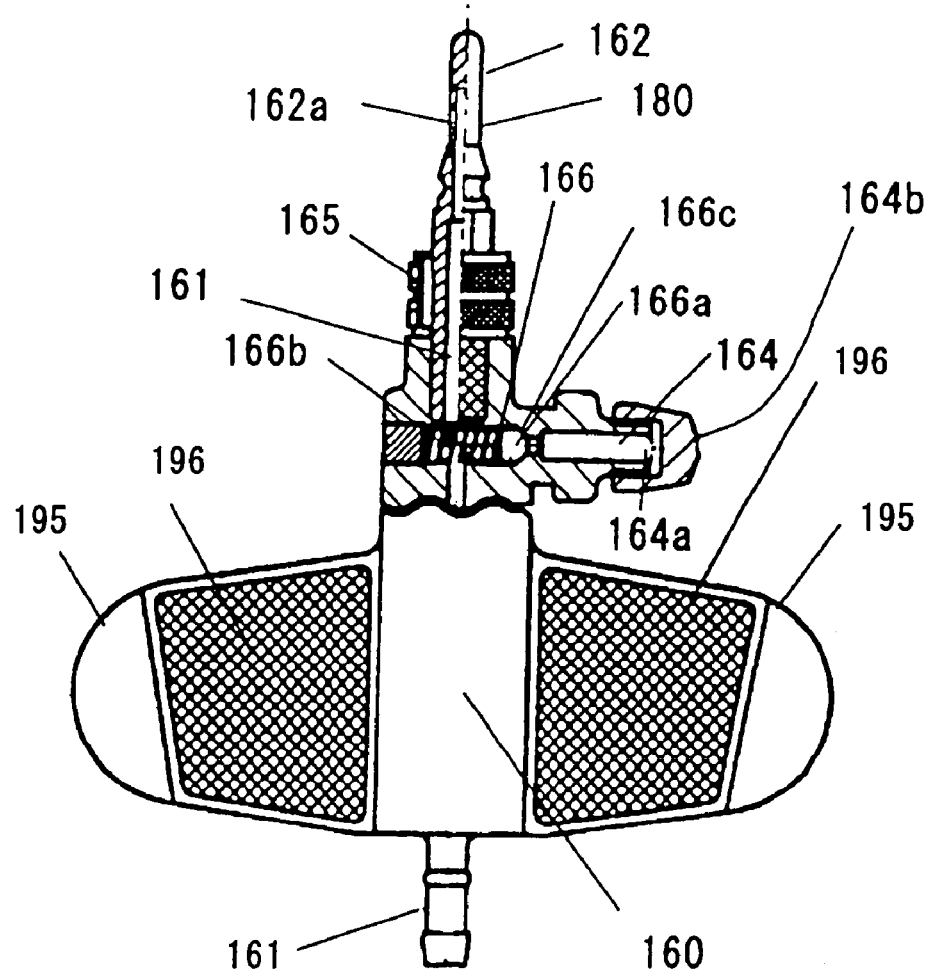
FIG. 24 is an enlarged, partially cross-sectional, side view of another embodiment of the pneumatic tire connecting device.

The pneumatic tire connecting device 160 is not limited to the above configuration. For example, the pneumatic tire connecting device 160 may have plate-like extending parts 195 and 195 extending from the outer periphery thereof and reflectors 196 and 196 which can reflect incident light may be attached on the extending parts 195 and 195, respectively, as shown in FIG. 24. This eliminates the need to attach a separately produced reflector to a spoke 104 (shown in FIG. 1) of a bicycle and improves convenience of use. Although the extending parts 195 and 195 having the reflectors 196 and 196 may be formed separately from the pneumatic tire connecting device 160 and attached thereto, the extending parts 195 and 195 having the reflectors 196 and 196 can be formed integrally with the pneumatic tire connecting device 160. When the extending parts 195 and 195 having the reflectors 196 and 196 are formed integrally with the pneumatic tire connecting device 160, the reflectors 196 and 196 can be produced at a low cost and the assembly work can be eliminated.

The air introducing hole 164 may be provided in either the automatic air supply mechanism 1 or the pneumatic tire connecting device 160. When the air introducing hole 164 is provided in the automatic air supply mechanism 1, it may be formed in the connection pipe 13c to communicate the air passage 13a with outside.

The air pressure checking device 190 may be attached not to the pneumatic tire connecting device 160 as shown in FIG. 24 but to the automatic air supply mechanism 1. When the air pressure checking device 190 may be attached to one of the constant pressure maintaining section 13b, connection tube 21 and connection pipe 13c constituting the connection section 13 in the automatic air supply mechanism 1 or may be attached to the pneumatic tire connecting device 160 when the automatic air supply mechanism 1 is provided with the pneumatic tire connecting device 160. Such a change can be made as necessary. The air pressure checking device 190 is not limited to the above configuration and may be a device which measures the air pressure and display the value.

In the sixth embodiment, adjustment of the compression ratio is made by moving the cylindrical casing 931 having the compression chamber 31 and movably attached to the hub 102 from the side of the outer periphery of the hub 102, and adjusting the position of the sliding part 32a with respect to the compression chamber 31. This invention is not limited to the configuration. For example, the position of the sliding part 32a in the axial direction of the compression chamber 31 with respect to the compression chamber 31 may be adjusted by making the piston rod 980 axially extendable and by adjusting the length thereof or by making the offset between the rotation center O2 of the axle 101 and the center O1 of the cam face 92a of the cam 984 adjustable and adjusting the offset. In such a case, however, since it is necessary to loosen the bolts 109b and 109b and remove the cylindrical casing 931 from the hub 102, the work for adjusting the displacement of the compression chamber 31 takes a long time. Thus, when the adjustment can be made by moving the cylindrical casing 931 from the side of the outer periphery of the hub 102 as in the sixth embodiment, the adjustment can be easily performed without work to remove the cylindrical casing 931 from the hub 102 and so on with the automatic air supply mechanism 1 of this invention assembled to the wheel.

Although the moving means for moving the cylindrical casing 931 with respect to the hub 102 is constituted of the female thread part 109c of the casing support member 109 and the male thread part 934 of the cylindrical casing 931, the cylindrical casing 931 may be attached to the hub 102 for sliding movement in a direction perpendicular to the axis of the axle 101 with respect to the hub 102. The other configurations of the sixth embodiment are the same as those of the first embodiment. The above is the description of the sixth embodiment.

Figure 16:
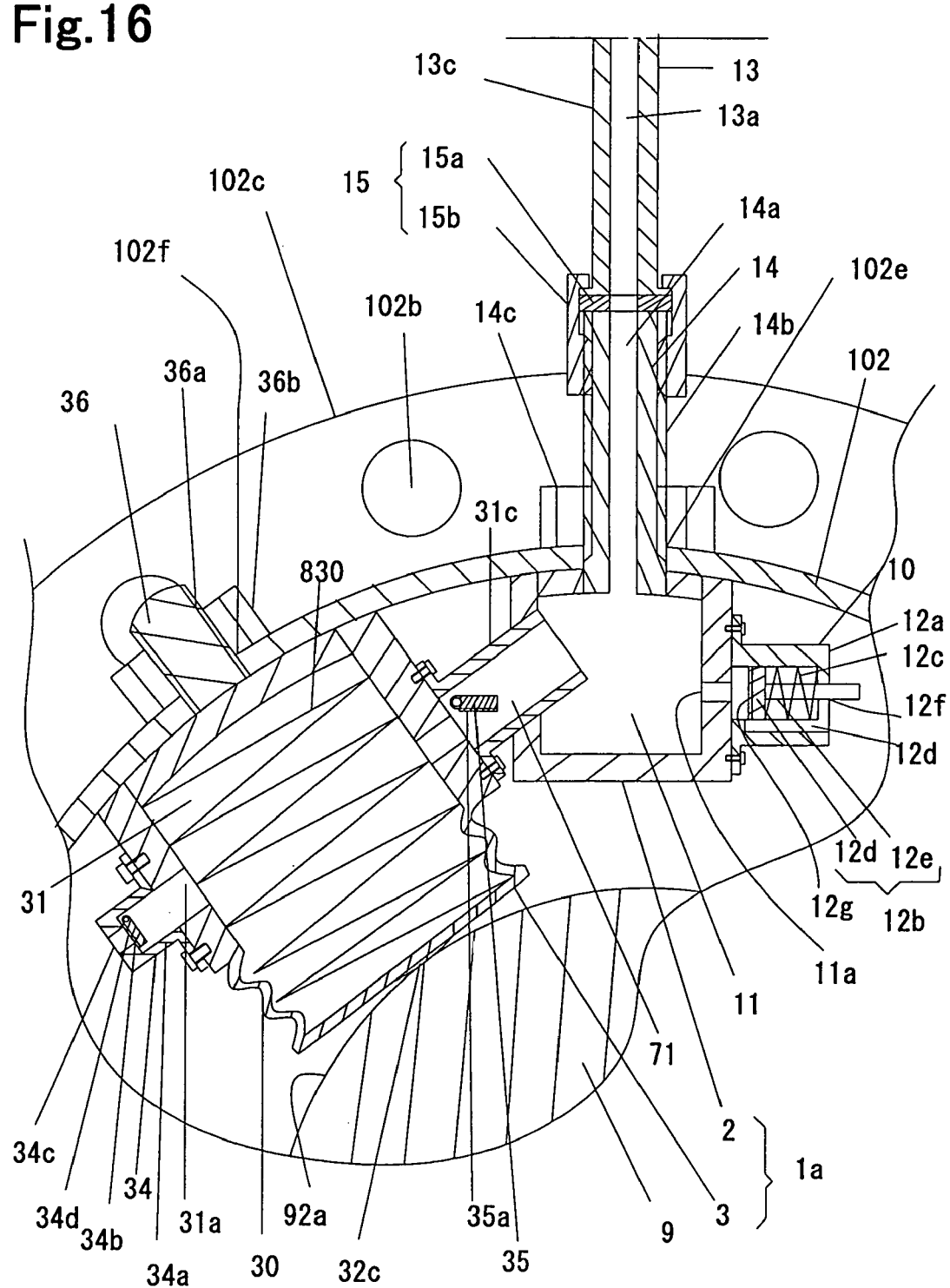
FIG. 16 is an enlarged cross-sectional explanatory view of another embodiment of an essential part of an air feeding section.

In the above embodiments, the air compression operation means is constituted of the piston rod 8, 80, or 980 as a compression operation body for compressing the air in the compression chamber 31 and the cam 9 or 984. This invention, however, is not limited to that and can be modified as needed. For example, as shown in FIG. 16, a extendable part 30 as an extendable compression operation body may be formed in the entire or a part of the peripheral wall of the compression chamber 31 in the axial direction thereof (an example, in which the extendable part 30 is formed in a part of the peripheral wall of the compression chamber 31 in the axial direction thereof, is shown in FIG. 16), and a cam contact part 32a may be formed on the end surface of the compression chamber 31 on the inside in the radial direction of the axle.

When the cam contact part 32c is slid on the cam face 92a of the cam 9, the extendable part 30 of the compression chamber 31 is contracted to reduce the capacity in the compression chamber 31, whereby the air in the compression chamber 31 is compressed. In this case, an urging member 830 for restoring the contracted compression chamber 31 as shown in FIG. 16 to its original extended state is provided. Alternatively, the extendable part 30 of the compression chamber 31 can be constituted of an elastic member so that the urging member 830 may be omitted. The amount the extendable part 30 can be extended and contracted may be adjustable so that the extendable part 30 can serve as compression ratio adjusting means.

In the above embodiments, the pressing part is constituted of the cam 9 having a cam face 92a around the entire periphery thereof. However, the axle 101 or 202 may be provided with a protrusion protruding in the radial direction thereof and the cam contact part may be configured to be brought into contact with the protrusion and pressed thereby when the hub 102 is rotated.

In the above embodiments, the piston rod 8 or 80 is configured to be pressed against the cam 9 having the cam face 92a as a pressing part and moved in the radial direction of the axle 101 or 202 when the hub 102 or 203 is rotated. However, changes can be made as needed. For example, a pressing part may protrude in the axial direction of the axle 101 or 202, and the piston rod 8 or 80 may be configured to be pressed and moved in the axial direction of the axle 101 or 202 when the hub 102 or 203 is rotated to compress the air in the compression chamber 31 by the movement.

Alternatively, a rotary compressor can be employed as the compression section 3. Such a change can be made as necessary.

In the first and second embodiments, the suction hole 31a of the compression chamber 31 is located in the vicinity of the bottom dead center position A1 of the sliding part 32a in the compression chamber 31 and no check valve is provided therein. However, the suction hole 31a may be located in the vicinity of the top dead center position B1 of the sliding part 32a in the compression chamber 31 and a check valve may be provided therein. In the third and fourth embodiments, the suction hole 31a of the compression chamber 31 is located in the vicinity of the upper dead center position B1 of the sliding part 32a in the compression chamber 31 and the valve body 34b as a check valve is provided therein. However, the suction hole 31a may be located in the vicinity of the bottom dead center position A1 of the sliding part 32a in the compression chamber 31 and a check valve may be omitted. Such a change can be made as necessary.

In the above embodiments, the valve 106 or 213 provided in an ordinary pneumatic tire 103 or 211 is used to serve as backflow preventing means for preventing backflow of air from the pneumatic tire 103 or 211 to the compression section 3. However, a valve as backflow preventing means may be provided in the pneumatic tire connection section 16 of the connection section 13.

When the pneumatic tire 103 or 211 is provided with the valve 106 or 213, the communication hole 31a or 301a may or may not be provided with backflow preventing means.

In the above embodiments, there is provided the connection section 13 connecting the air feeding section and the pneumatic tire in air flow communication and the connection section is removably connected to the air feeding section and the pneumatic tire so that when a trouble occurred in the connection section, the air feeding section or the pneumatic tire after assembly, each of the parts can be exchanged separately for convenience of use. However, this invention is not limited to the above configuration. These parts may be permanently connected.

The constant pressure maintaining section 2 and the compression section 3 maybe located in any position on the wheel body 110 or 210. For example, when used in the bicycle wheel as in the first to third embodiments, the constant pressure maintaining section 2 and the compression section 3 may be located on the rim 105. When used in the car wheel as in the fourth embodiment, the constant pressure maintaining section 2 and the compression section 3 may be located on the outer periphery of the outer where 205 or on the tire wheel 212.

In the above embodiments, the cam 9 having a circular contour is employed and the sliding part 32a of the piston rod 8 or 80 is configured to reciprocate between the bottom dead center position A1 and the top dead center position B1 in the compression chamber 31 once while the piston rod 8 or 80 is rotated once with respect to the cam 9. This invention is not limited to this configuration and can be modified as needed. For example, the sliding part 32a of the piston rod 8 or 80 may be configured to reciprocate between the bottom dead center position A1 and the top dead center position B1 in the compression chamber 31 once or more, for example once and half, twice or three times, or move from the bottom dead center position A1 to the top dead center position B1 or from the top dead center position B1 to the bottom dead center position A1 while the piston rod 8 or 80 is rotated once with respect to the cam 9.

The automatic air supply mechanism for a pneumatic tire according to this invention is not limited to use in a pneumatic tire for a bicycle wheel or a car wheel and applicable to various types of pneumatics tires mounted on a wheel body rotatable with respect to an axle. For example, it is applicable to a pneumatic tire for a unicycle, a pneumatic tire for a two-wheeler such as a motorcycle or a rear car, various types of three-wheelers, and four-wheelers and pneumatic tire for a wheel for an elevator attached to a car of an elevator in such a manner as to be able to run on a wall surface.

The components of the first to sixth embodiments may be combined as necessary to create another embodiment. For example, one or at least two of the pneumatic tire connecting device 160 having the air introducing hole 164, the air pressure checking device 190 and the compression ratio adjusting means of the sixth embodiment may be provided in the embodiment.

The automatic air supply mechanism for a pneumatic tire for automatically supplying air into a pneumatic tire mounted on a wheel body rotatable with respect to an axle, comprising: an air feeding section provided on a wheel and connected to the pneumatic tire in air flow communication for feeding air into the pneumatic tire, the air feeding section being provided with a compression section which can compress air when the wheel body is rotated with respect to the axle.

Thereby, when the wheel body is rotated with respect to the axle, the compression section compresses air and the compressed air can be fed to the pneumatic tire.

Thus, the wheel body need only be rotated with respect to the axle by, for example, running the bicycle. Thereby, air is compressed in the compression section at a prescribed compression ratio and the compressed air is fed into the pneumatic tire to maintain the air pressure in the pneumatic tire at a constant value.

This prevents the tire from being used with the air pressure therein lower than a prescribed value and eliminates the need to supply air to the pneumatic tire with an air pump or the like every time the air pressure therein becomes low, improving convenience of use.

The automatic air supply mechanism of this invention further comprises compression ratio adjusting means which can adjust the compression ratio at which air is compressed in the compression section.

Thereby, air with a pressure suitable for the type of the pneumatic tire can be supplied thereto. For example, the air pressure in the pneumatic tire can be varied according to the types of bicycles, such as ordinary bicycles, racing bicycles, and mountain bikes, according to the weight of the rider, or according to whether the pneumatic tire is mounted on a front wheel or a rear wheel. Moreover, the air pressure can be adjusted values suitable for various types of pneumatic tires for two-wheelers and cars.

The automatic air supply mechanism for a pneumatic tire of this invention further comprises a constant pressure maintaining section provided in the air feeding section, connected to the compression section in air flow communication and connected to the pneumatic tire in air flow communication, and backflow preventing means provided between the constant pressure maintaining section and the compression section for preventing backflow of air from the constant pressure maintaining section to the compression section.

Thereby, when the air pressure in the pneumatic tire becomes lower than that in the constant pressure maintaining section, air is automatically fed from the constant pressure maintaining section to the pneumatic tire until the air pressure in the pneumatic tire becomes equal to that in the constant pressure maintaining section. Thus, even when the wheel body is not rotated with respect to the axle and the air is not compressed in the compression section, air can be fed from the constant pressure maintaining section to the pneumatic tire to maintain the air pressure in the pneumatic tire constant.

Also, when the amount of air compressed in the compression section is small, air is fed to the constant pressure maintaining section a plurality of times so that the air pressure in the constant pressure maintaining section can be maintained at a constant value. Thereby, air can be compressed at a suitable compression ratio in the compression section and the compressed air can be held in the constant pressure maintaining section easily.

The compression section of the automatic air supply mechanism of this invention is provided with a compression chamber which can take in air from the outside and compression operation means for performing operations to compress air in the compression chamber when the wheel body is rotated with respect to the axle.

Thereby, the air in the compression chamber can be easily compressed by the compression operation means when the wheel body is rotated with respect to the axle and the operation means can be easily produced at a low cost.

The compression section of the automatic air supply mechanism of this invention is configured to compress air in a compression chamber at a prescribed compression ratio so that the air in the compression chamber can flow therefrom into the pneumatic tire and the air pressure in the pneumatic tire can be a value suitable for the pneumatic tire.

Thereby, since there is no need to adjust the pressure of air compressed in the compression section, the structure can be simplified and the production cost can be reduced.

The compression operation means of the automatic air supply mechanism of this invention has a pressing section provided on the axle and compression operation body for performing operations to compress air in the compression chamber, and air in the compression chamber is subjected to compression operations when the compression operation body is brought into contact with the pressing section and pressed thereagainst by rotation of the wheel body with respect to the axle.

Thereby, when the wheel body is rotated with respect to the axle, the compression operation body is brought into contact with the pressing section and pressed thereagainst, whereby the air in the compression chamber is subjected to compression operations. Thus, since the air in the compression chamber can be easily compressed, the production can be facilitated and the production cost can be reduced.

The automatic air supply mechanism for a pneumatic tire of this invention further comprises a connection section for connecting the compression section and the pneumatic tire in air flow communication, wherein the constant pressure maintaining section is constituted of the connection section.

Thereby, since the constant pressure maintaining section can be omitted, the structure can be simplified and the size can be reduced.

The automatic air supply mechanism for a pneumatic tire of this invention further comprises a connection section for connecting the compression section and the pneumatic tire in air flow communication, the connection section being provided with an air passage for passing air from the compression section to the pneumatic tire and air pressure checking means for checking the air pressure in the air passage.

Thereby, the air pressure in the air passage can be checked with the air pressure checking means. Thus, when air cannot be compressed to a prescribed pressure in the compression section and the air pressure in the air passage is lower than a prescribed value, or when there is an air leak somewhere between the compression section and the air pressure checking means and the air pressure in the air passage is lower than a prescribed value, it can be recognized instantaneously. Thus, when a problem occurs, it is possible to cope with it immediately.

The automatic air supply mechanism for a pneumatic tire of this invention further comprises a connection section for connecting the compression section and the pneumatic tire in air flow communication, the connection section being provided with an air passage for passing air from the compression section to the pneumatic tire and an air introducing hole communicating the air passage with the outside, the air introducing hole being provided with air introducing hole backflow preventing means for preventing backflow of air from the air passage to the outside, whereby air can be introduced into the pneumatic tire through the air introducing hole and the air passage in addition to through the air feeding section.

Thereby, since the connection section connecting the compression section and the pneumatic tire in air flow communication has an air introducing hole provided with air introducing hole backflow preventing means for preventing backflow of air from the air passage to the outside, air can be introduced into the pneumatic tire through the air introducing hole and the air passage in addition to through the air feeding section. Thus, the air can be supplied to the pneumatic tire with the automatic air supply mechanism connected thereto with an air pump or the like. Thus, when a large amount of air must be fed into the pneumatic tire at a time, the air pressure in the pneumatic tire can be adjusted to a value suitable for the pneumatic tire with an air pump or the like.

The air feeding section of the automatic air supply mechanism of this invention is provided with pressure adjusting means for adjusting the pressure of air compressed in the compression section.

Thereby, even if air is not compressed to a pressure suitable for the pneumatic tire in the compression section, the pressure of air compressed in the compression section can be adjusted to a value suitable for the pneumatic tire by the pressure adjusting means and the adjusted air can be fed to the pneumatic tire.

In the automatic air supply mechanism for a pneumatic tire of this invention, the compression chamber is secured to a hub provided on a wheel body for a two-wheeler, the pressing section is secured to an axle for a two-wheeler, and air in the compression chamber is subjected to compression operations when the compression operation body is brought into contact with the pressing section and pressed thereagainst by rotation of the wheel body with respect to the axle.

In general, spokes are attached on both right and left side ends of the hub of a bicycle wheel and ball pushers are provided as shown in FIG. 2 but nothing is disposed therebetween. Thus, the compression chamber of the automatic air supply mechanism can be easily attached without being interfered with by other parts.

In addition, when the compression chamber is attached to the hub, for example, the connection section connecting the compression chamber and the pneumatic tire can be located between the spokes. Thus, even if the bicycle falls over, the spokes protect the connection section and decreases the possibility of the connection section hitting on something and being damaged.

A wheel for a two-wheeler is removed from a body with the hub, spokes, rim and pneumatic tire fitted to the axle. Thus, when the wheel has to be removed from the body after the automatic air supply mechanism has been assembled thereto, it can be removed without disassembling the automatic air supply mechanism. Thus, the wheel can be used in the same manner as a conventional wheel for a two-wheeler and thus is suitable for two-wheelers such as bicycles and motorcycles.

The automatic air supply mechanism for a pneumatic tire of this invention further comprises compression ratio adjusting means which can adjust the compression ratio at which air is compressed in the compression section, wherein the compression chamber is configured to be shifted from an expanded state where the capacity therein is expanded to a contracted state where the capacity therein is smaller than that in the expanded state to compress air in the compression chamber when the compression operation body is brought into contact with the pressing section and pressed thereagainst by rotation of the wheel body with respect to the axle, and wherein the compression ratio adjusting means is configured to adjust the ratio between the capacity of the compression chamber in the expanded state and the capacity of the compression chamber in the contracted state.

Thereby, by adjusting the amount the compression operation member can be moved by being pressed by the pressing section when the wheel body is rotated with respect to the axle, the capacity in the compression chamber in the expanded state and the capacity in the compression chamber in the contracted state can be adjusted. This makes adjustment of the compression ratio easy.

The automatic air supply mechanism for a pneumatic tire of this invention further comprises compression ratio adjusting means which can adjust the compression ratio at which air is compressed in the compression section, wherein the pressing section is constituted of a cam secured on an axle of a two-wheeler, wherein the compression operation body has a sliding part slidable in the compression chamber and a cam contact part in contact with the cam, wherein the sliding part is configured to be slid in the compression chamber in the axial direction thereof from a bottom dead center position at which the compression chamber is in the expanded state to a top dead center position at which the compression chamber is in the contracted state when the wheel body is rotated with respect to the axle and the cam contact part follows the cam, wherein the compression chamber is attached on an outer periphery of a hub provided on a wheel body for a two-wheeler such that it is operable and movable from the side of the outer periphery of the hub so that the bottom dead center position and the top dead center position of the sliding part of the compression operation body with respect to the compression chamber can be changed, and wherein the compression ratio adjusting means is configured to change the bottom dead center position and the top dead center position of the sliding part of the compression operation body with respect to the compression chamber by operation to move the compression chamber to adjust the ratio between the capacity in the compression chamber in the expanded state and the capacity in the compression chamber in the contracted state.

Thereby, an operation to move the compression chamber can be performed from the side of the outer periphery of the hub with the automatic air supply mechanism assembled to the wheel without disassembling it even after the automatic air supply mechanism has been assembled to a wheel for a two-wheeler. In addition, by the operation to move the compression chamber, the bottom dead center position and the top dead center position of the sliding part of the compression operation body with respect to the compression chamber can be changed and the ratio between the capacity in the compression chamber in the expanded state and the capacity in the compression chamber in the contracted state can be adjusted. This makes operation to adjust the compression ratio easy.

The automatic air supply mechanism for a pneumatic tire of this invention further comprises fastening means having a plurality of positions for removably fastening the compression chamber with respect to the hub, whereby the bottom dead center position and top dead center position of the sliding part of the compression operation body with respect to the compression chamber can be changed by positioning the compression chamber using the plurality of positions of the fastening means.

Thereby, the compression ratio can be adjusted easily, minutely and precisely.

In the automatic air supply mechanism for a pneumatic tire of this invention, the pressing part is constituted of a circular cam, the compression operation body has a sliding part slidable in the compression chamber and a cam contact part in contact with the cam, and the sliding part is configured to be slid in the compression chamber to compress air therein when the wheel body is rotated with respect to the axle and the cam contact part follows the cam, the cam contact part having a plurality of rolling members in rolling contact with the cam and a connection member connecting the plurality of rolling members, the rolling members being arranged around the periphery of the cam such that they are relatively immovable in the radial direction of the cam with respect to the cam.

Thereby, the cam contact part can constitute a positive motion cam which is kept in contact with the cam when the compression operation body is rotated with respect to the cam. This eliminates the need for a spring or the like for pressing the cam contact part against the cam so that it will not be separated from the cam.

In addition, since the rolling members are in rolling contact with the cam at a plurality of points, friction between them can be significantly reduced. Thereby, since abrasion of the rolling members and the cam is reduced, the possibility of having troubles is low after a long period of use.

The pneumatic tire connecting device of this invention is a pneumatic tire connecting device for connecting an automatic air supply mechanism for a pneumatic tire for automatically supplying air into a pneumatic tire mounted on a wheel body rotatable about an axle to a pneumatic tire, comprising: a tire connection section connected to the pneumatic tire, an automatic supply mechanism connection section connected to the automatic air supply mechanism, a pneumatic tire connecting air passage provided between the tire connection section and the automatic supply mechanism connection section in air flow communication, and an air introducing hole communicating the pneumatic tire connecting air passage with the outside, the pneumatic tire connecting air passage being configured to be able to pass air from the automatic air supply mechanism to the pneumatic tire by being connected to an air passage provided in the automatic air supply mechanism when the automatic supply mechanism connection section and the automatic air supply mechanism are connected, the tire connection section having a valve hole opened to communicate the pneumatic tire connecting air passage with the outside and provided with a valve mounting part to which a check valve for preventing backflow of air from the pneumatic tire to the pneumatic tire connecting air passage can be attached, the air introducing hole being provided with an air introducing hole backflow preventing means for preventing air from escaping from the pneumatic tire connecting air passage to the outside, whereby, when the check valve is attached to the valve mounting part, the valve hole is closed by the check valve so that backflow of air from the pneumatic tire to the pneumatic tire connecting air passage can be prevented in connecting the tire connection section and the pneumatic tire, and when air is fed from the pneumatic tire connecting air passage to the valve hole, the valve hole is opened so that air can enter the pneumatic tire from the pneumatic tire connecting air passage.

Thereby, the automatic air supply mechanism and the pneumatic tire can be easily connected to each other.

When the check valve is attached to the valve mounting part, the valve hole of the valve mounting part is closed by the check valve. When the tire connection section is connected to the pneumatic tire in this state, backflow of air from the pneumatic tire to the pneumatic tire connecting air passage can be prevented. Then, when air is fed into the valve hole through the pneumatic tire connecting air passage, the valve hole is opened, allowing air to flow into the pneumatic tire from the pneumatic tire connecting air passage. Thus, it is not necessary to do anything other than attach the check valve to the valve mounting part and connect the tire connection section to the pneumatic tire. Also, a check valve provided in an ordinary pneumatic tire can be omitted and the connecting operation can be facilitated.

Additionally, air can be introduced into the pneumatic tire through the air introducing hole and the pneumatic tire connecting air passage with an air pump or the like, not with the automatic air supply mechanism.

The pneumatic tire connecting device of this invention has an outer periphery on which a reflector which can reflect incident light is provided.

Thereby, when the reflector is attached to the pneumatic tire in connecting the automatic air supply mechanism with the pneumatic tire, the wheel can be provided with the reflector. This eliminates the work of attaching a specifically produced reflector to the spokes of the wheel as in the past and improves convenience of use. The reflector may be produced integrally with the pneumatic tire connecting device. Thereby, the reflector can be easily produced at a low cost.

In the above description, the present invention has been described as preferred embodiments. It is understood that the terminology employed herein is for the purpose of description and not of limitation, and that various modification can be made without departing from scope and sprit of the present invention within the scope of the appended claims.

The invention claimed is:

1. An automatic air supply mechanism for a pneumatic tire for automatically supplying air into a pneumatic tire mounted on a wheel body rotatable with respect to an axle, comprising:
   an air feeding section provided on a wheel and connected to said pneumatic tire in air flow communication for feeding air into said pneumatic tire,
   said air feeding section being provided with a compression section which can compress air when said wheel body is rotated with respect to said axle,
   wherein said compression section is parovided with a compression chamber which can take in air from the outside and a compression operation means for performing operations to compress air in said compression chamber when said wheel body is rotated with respect to said axel,
   wherein said compression operation means has a pressing section provided on said axle and compression operation body for performing operations to compress air in said compression chamber,
   wherein air in said compression chamber is subjected to compression operations when said compression operation body is brought into contact with said pressing section and pressed there against by rotation of said wheel body with respect to said axle,
   wherein said compression chamber is secured to a hub provided on a wheel body for a two-wheeler,
   wherein said pressing section is secured to an axle for a two-wheeler, and
   wherein air in said compression chamber is subjected to compression operations when said compression operation body is brought into contact with said pressing section and pressed thereagainst by rotation of said wheel body with respect to said axle.

2. An automatic air supply mechanism for a pneumatic tire for automatically supplying air into a pneumatic tire mounted on a wheel body rotatable with respect to an axle, comprising:
   an air feeding section provided on a wheel and connected to said pneumatic tire in air flow communication for feeding air into said pneumatic tire,
   said air feeding section being provided with a compression section which can compress air when said wheel body is rotated with respect to said axle,
   a compression ratio adjusting means which can adjust the compression ratio at which air is compressed in said compression section,
   wherein said compression section is provided with a compression chamber which can take in air from the outside and a compression operation means for performing operations to compress air in said compression chamber when said wheel body is rotated with respect to said axle,
   wherein said compression operation means has a pressing section provided on said axle and compression operation body for performing operations to compress air in said compression chamber,
   wherein air in said compression chamber is subjected to compression operations when said compression operation body is brought into contact with said pressing section and pressed there against by rotation of said wheel body with respect to said axle,
   wherein said compression chamber is configured to be shifted from an expanded state where the capacity therein is expanded to a contracted state where the capacity therein is smaller than that in said expanded state to compress air in said compression chamber when said compression operation body is brought into contact with said pressing section and pressed there against by rotation of said wheel body with respect to said axle, and
   wherein said compression ratio adjusting means is configured to adjust the ratio between the capacity of said compression chamber in said expanded state and the capacity of said compression chamber in said contracted state.

3. An automatic air supply mechanism for a pneumatic tire for automatically supplying air into a pneumatic tire mounted on a wheel body rotatable with respect to an axle, comprising:
   an air feeding section provided on a wheel and connected to said pneumatic tire in air flow communication for feeding air into said pneumatic tire,
   said air feeding section being provided with a compression section which can compress air when said wheel body is rotated with respect to said axle, a compression ratio adjusting means which can adjust the compression ratio at which air is compressed in said compression section, wherein said compression section is provided with a compression chamber which can take in air from the outside and a compression operation means for performing operations to compress air in said compression chamber when said wheel body is rotated with respect to said axle, wherein said compression operation means has a pressing section provided on said axle and compression operation body for performing operations to compress air in said compression chamber, wherein air in said compression chamber is subjected to compression operations when said compression operation body is brought into contact with said pressing section and pressed there against by rotation of said wheel body with respect to said axle, wherein said pressing section is constituted of a cam secured on an axle of a two-wheeler, wherein said compression operation body has a sliding part slidable in said compression chamber and a cam contact part in contact with said cam, wherein said sliding part is configured to be slid in said compression chamber in the axial direction thereof from a bottom dead center position at which said compression chamber is in said expanded state to a top dead center position at which said compression chamber is in said contracted state when said wheel body is rotated with respect to said axle and said cam contact part follows said cam, wherein said compression chamber is attached on an outer periphery of a hub provided on a wheel body for a two-wheeler such that it is operable and movable from the side of said outer periphery of said hub so that said bottom dead center position and said top dead center position of said sliding part of said compression operation body with respect to said compression chamber can be changed, and wherein said compression ratio adjusting means is configured to change said bottom dead center position and said top dead center position of said sliding part of said compression operation body with respect to said compression chamber by operation to move said compression chamber to adjust the ratio between the capacity in said compression chamber in said expanded state and the capacity in said compression chamber in said contracted state.

4. The automatic air supply mechanism for a pneumatic tire as claimed in claim 3, further comprising fastening means having a plurality of positions for removably fastening said compression chamber with respect to said hub, whereby said bottom dead center position and top dead center position of said sliding part of said compression operation body with respect to said compression chamber can be changed by positioning said compression chamber using said plurality of positions of said fastening means.

5. An automatic air supply mechanism for a pneumatic tire for automatically supplying air into a pneumatic tire mounted on a wheel body rotatable with respect to an axle, comprising:

an air feeding section provided on a wheel and connected to said pneumatic tire in air flow communication for feeding air into said pneumatic tire, said air feeding section being provided with a compression section which can compress air when said wheel body is rotated with respect to said axle, wherein said compression section is provided with a compression chamber which can take in air from the outside and a compression operation means for performing operations to compress air in said compression chamber when said wheel body is rotated with respect to said axle, wherein said compression operation means has a pressing section provided on said axle and compression operation body for performing operations to compress air in said compression chamber, wherein air in said compression chamber is subjected to compression operations when said compression operation body is brought into contact with said pressing section and pressed there against by rotation of said wheel body with respect to said axle, wherein said pressing part is constituted of a circular cam, wherein said compression operation body has a sliding part slidable in said compression chamber and a cam contact part in contact with said cam, and wherein said sliding part is configured to be slid in said compression chamber to compress air therein when said wheel body is rotated with respect to said axle and said cam contact part follows said cam, said cam contact part having a plurality of rolling members in rolling contact with said cam and a connection member connecting said plurality of rolling members, said rolling members being arranged around the periphery of said cam such that they are relatively immovable in the radial direction of said cam with respect to said cam.

* * * * *